United States Patent
Bao et al.

(10) Patent No.: US 12,353,383 B1
(45) Date of Patent: Jul. 8, 2025

(54) METHOD AND SYSTEM FOR HYPERSPACE SPARSE PARTITION VECTOR SIMILARITY SEARCH

(71) Applicant: Dell Products L.P., Round Rock, TX (US)

(72) Inventors: Qi Bao, Acton, MA (US); Gaurav Chawla, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/890,960

(22) Filed: Sep. 20, 2024

(51) Int. Cl.
*G06F 16/22* (2019.01)
*G06F 16/27* (2019.01)
*G06F 16/28* (2019.01)

(52) U.S. Cl.
CPC ........ *G06F 16/2237* (2019.01); *G06F 16/278* (2019.01); *G06F 16/287* (2019.01)

(58) Field of Classification Search
CPC ... G06F 16/2237; G06F 16/278; G06F 16/287
See application file for complete search history.

(56) References Cited

U.S. PATENT DOCUMENTS

| | | | |
|---|---|---|---|
| 2015/0278376 A1* | 10/2015 | Qin | G06F 16/951 707/706 |
| 2022/0391411 A1* | 12/2022 | Grimaldi | G06F 11/3409 |

* cited by examiner

*Primary Examiner* — Cam Y T Truong
(74) *Attorney, Agent, or Firm* — Chamberlain Hrdlicka; Aly Z. Dossa

(57) ABSTRACT

A method for performing vector similarity search (VSS) includes: performing, based on a set of thresholds, a sparse partitioning of n-dimensional hyperspace into a plurality of grid bins to generate a hyperspace partition map, in which (i) only grid bins to which vectors mapped to are managed by the hyperspace partition map and (ii) each grid bin of the plurality of grid bins points to a storage location in a storage; ingesting a vector; using the hyperspace partition map to identify a grid bin of the plurality of grid bins for the vector and to identify coordinates of the grid bin; mapping the vector to the grid bin; and hashing the coordinates to generate a storage location key associated with a second storage location, in which the vector is stored to the second storage location using the storage location key.

20 Claims, 17 Drawing Sheets

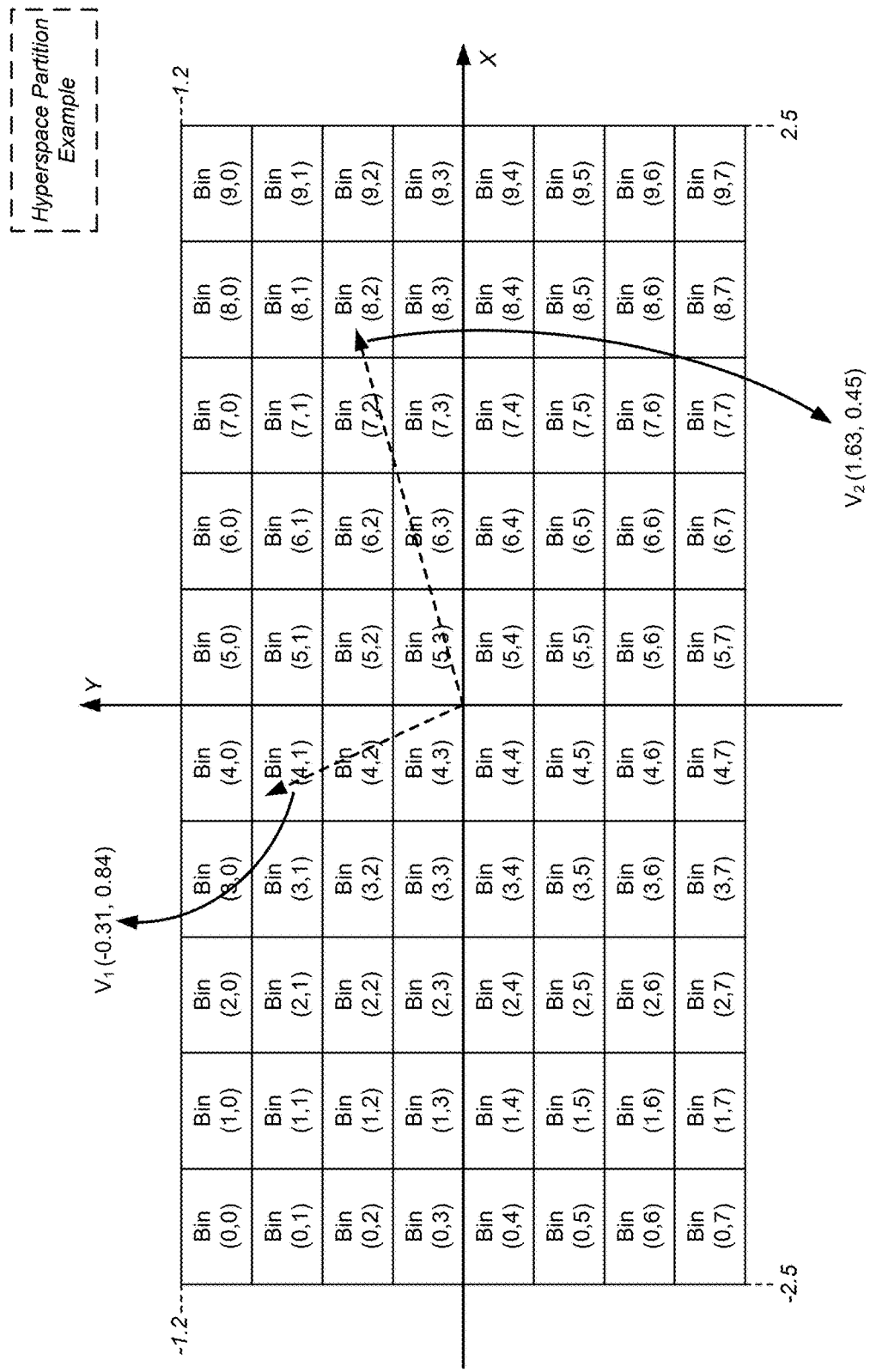
FIG. 2.1

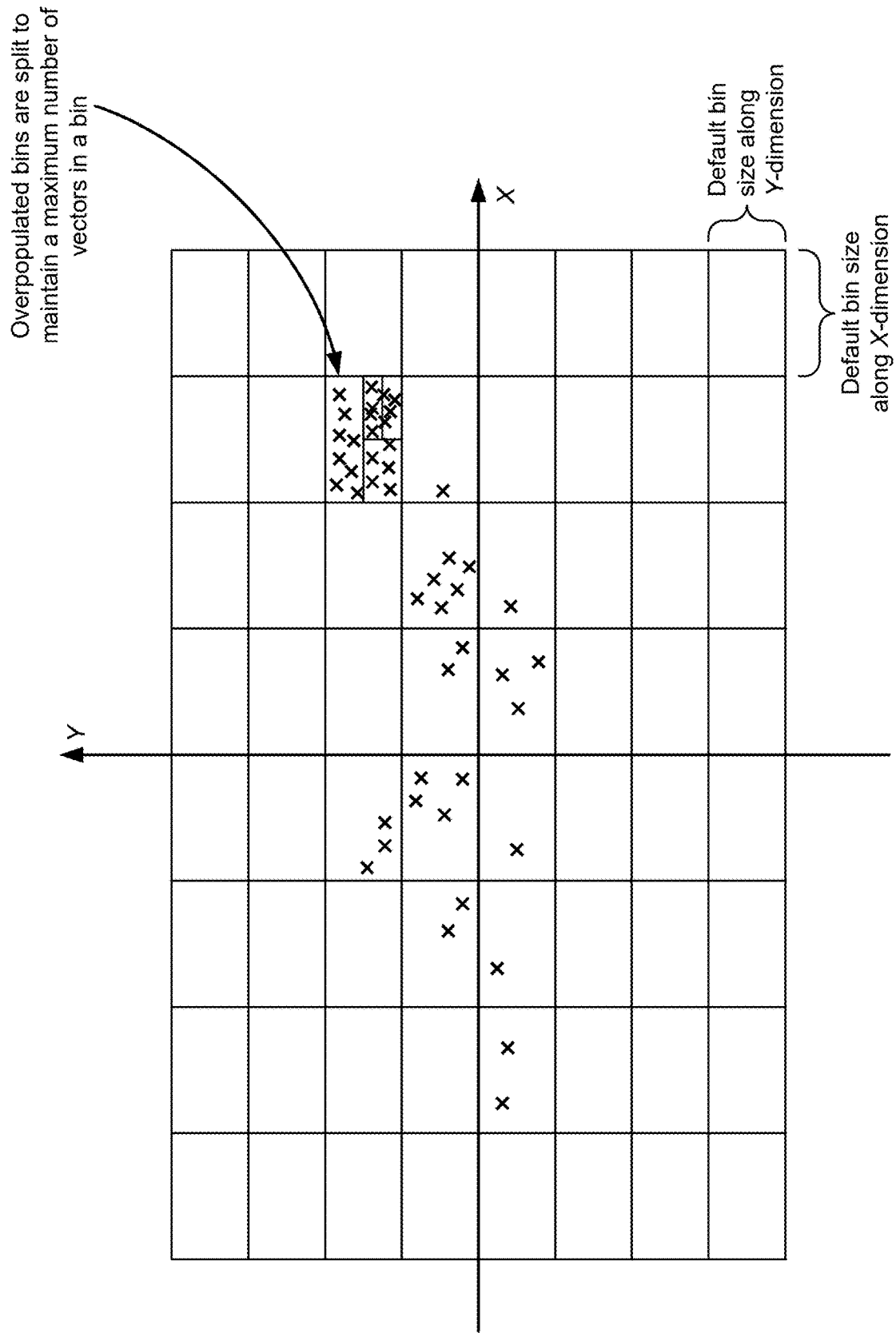
FIG. 2.2

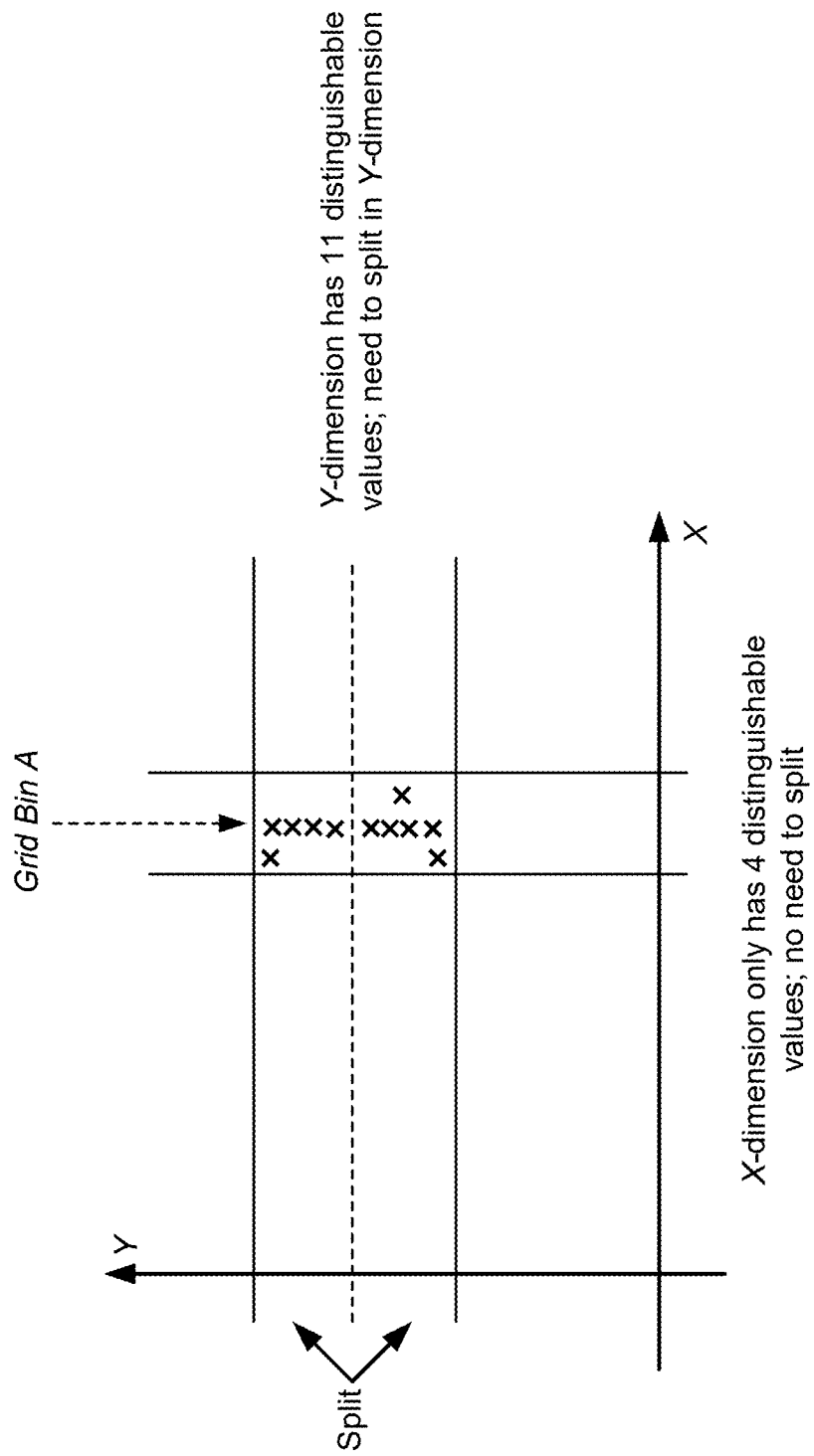
FIG. 2.3

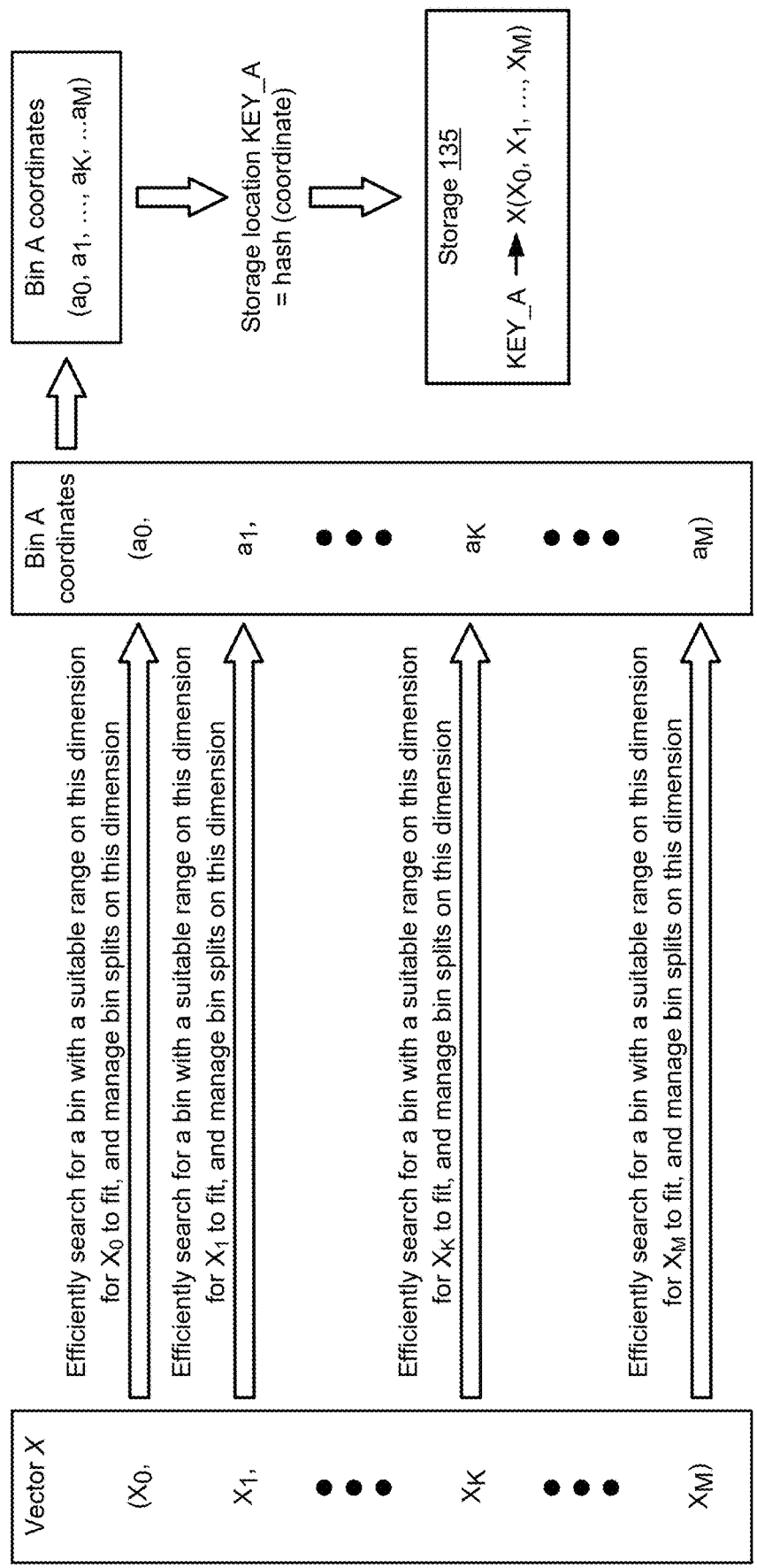
FIG. 2.4

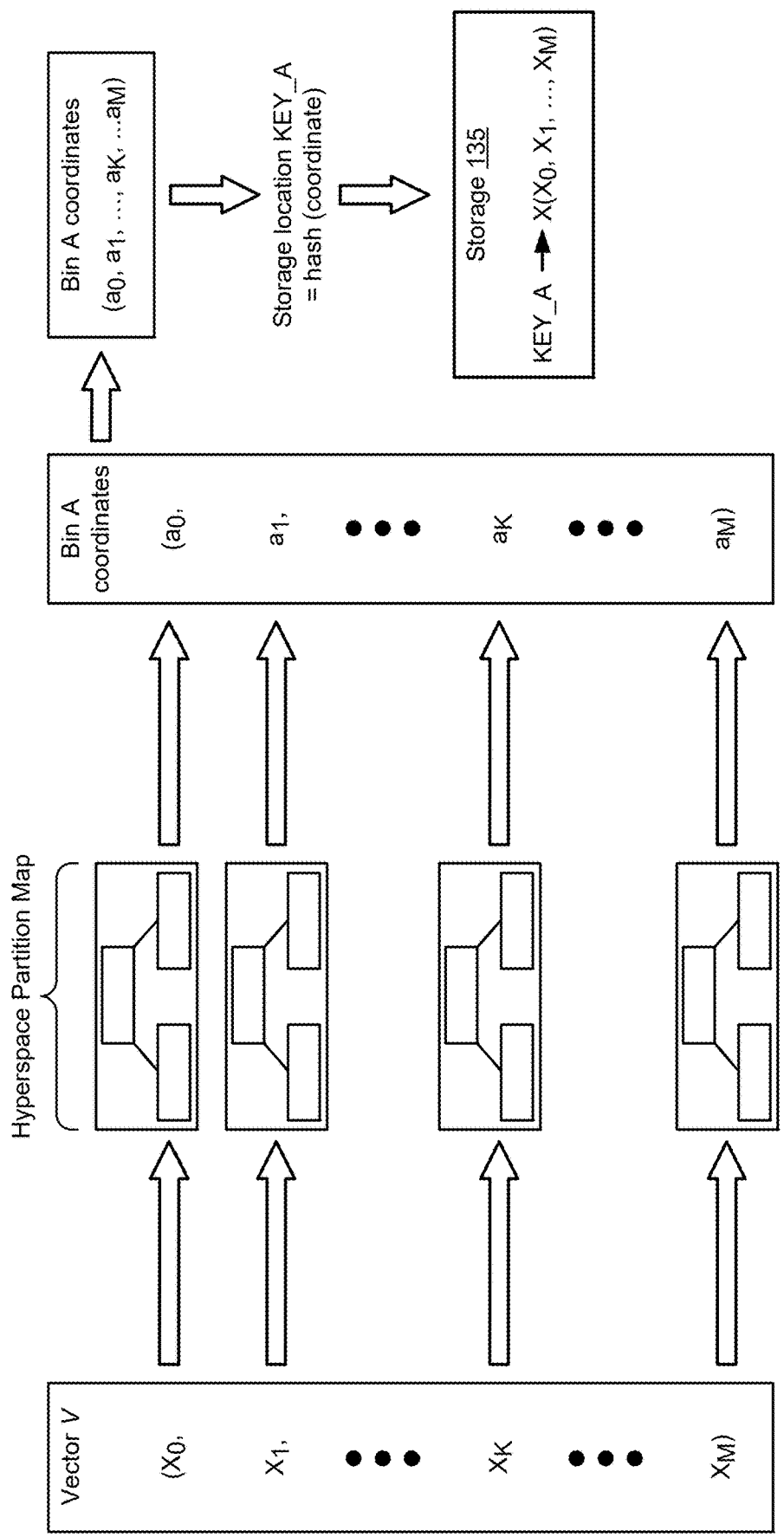
FIG. 2.5

[ *Hyperspace Partition Map: Ingest Vectors and Build a B-Tree* ]

(a) Assume here that X-dimension has a value range of "-1.0" and "1.0", with a default bin size of 0.001 (e.g., supporting million vectors)
(b) B-Tree has an order of 2 and each bin has maximum number of distinguishable values (MNDV) of 10

Step 1: The tree is empty, no vector is ingested

Step 2: A vector with an X-dimension value of 0.12035 is ingested. Because there is no key that can hold the vector, a new key (i.e., a new bin) needs to be inserted to the empty tree. The key has the following properties:

(i) start coordinate: 0.120; (ii) end coordinate: 0.121; (iii) current number of distinguished values (CNDV): 1; and (iv) MNDV: 10 (bin coordinates if a default bin size is used, which could change if the bin already existed and split)

Further, the key has data "1119" (bin coordinates if a default bin size is used, which could change if the bin already existed and split)

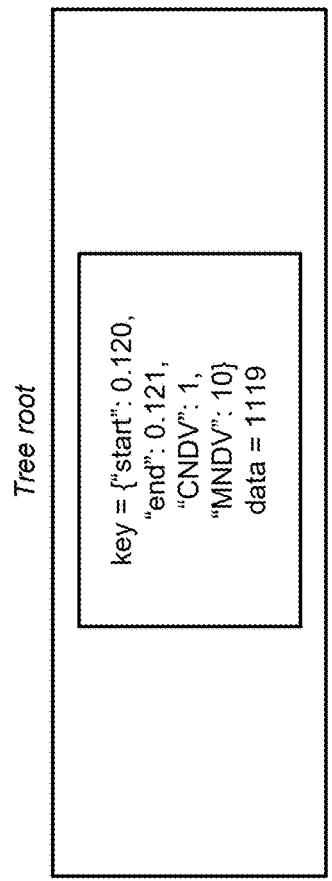

FIG. 3.1

*Hyperspace Partition Map: Ingest Vectors and Build the B-Tree*

Step 3: A vector with an X-dimension value of -0.2054 is ingested. No existing keys can hold this value and a new key needs to be inserted to the tree root, as there is space in the node. The key has the following properties:

(i) start coordinate: -0.206; (ii) end coordinate: -0.205; (iii) CNDV: 1; and (iv) MNDV: 10

Further, the bin has data "794" (bin coordinates if a default bin size is used, which could change if the bin already existed and split)

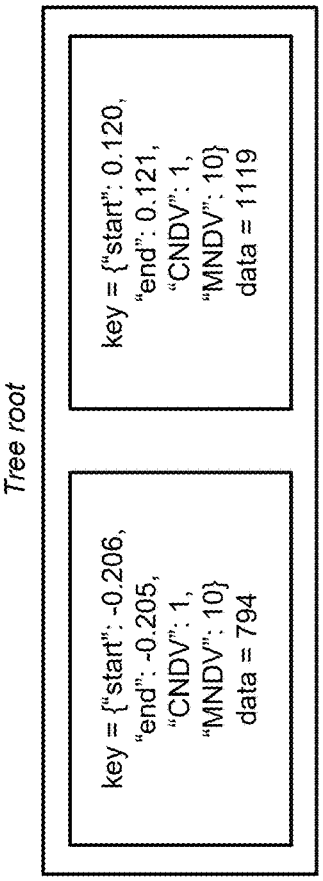

FIG. 3.2

*Hyperspace Partition Map: Ingest Vectors and B-Tree Node Split*

Step 4: A vector with an X-dimension value of 0.4121 is ingested. No key can hold this value and a new key needs to be inserted to the tree root, but the root node is already full. For this reason, the root node needs to be split so that new nodes can be added to the tree. The key has the following properties:

(i) start coordinate: 0.412; (ii) end coordinate: 0.413; (iii) CNDV: 1; and (iv) MNDV: 10

Further, the bin has data "1411" (bin coordinates if default bin size is used, which could change if the bin already existed and split)

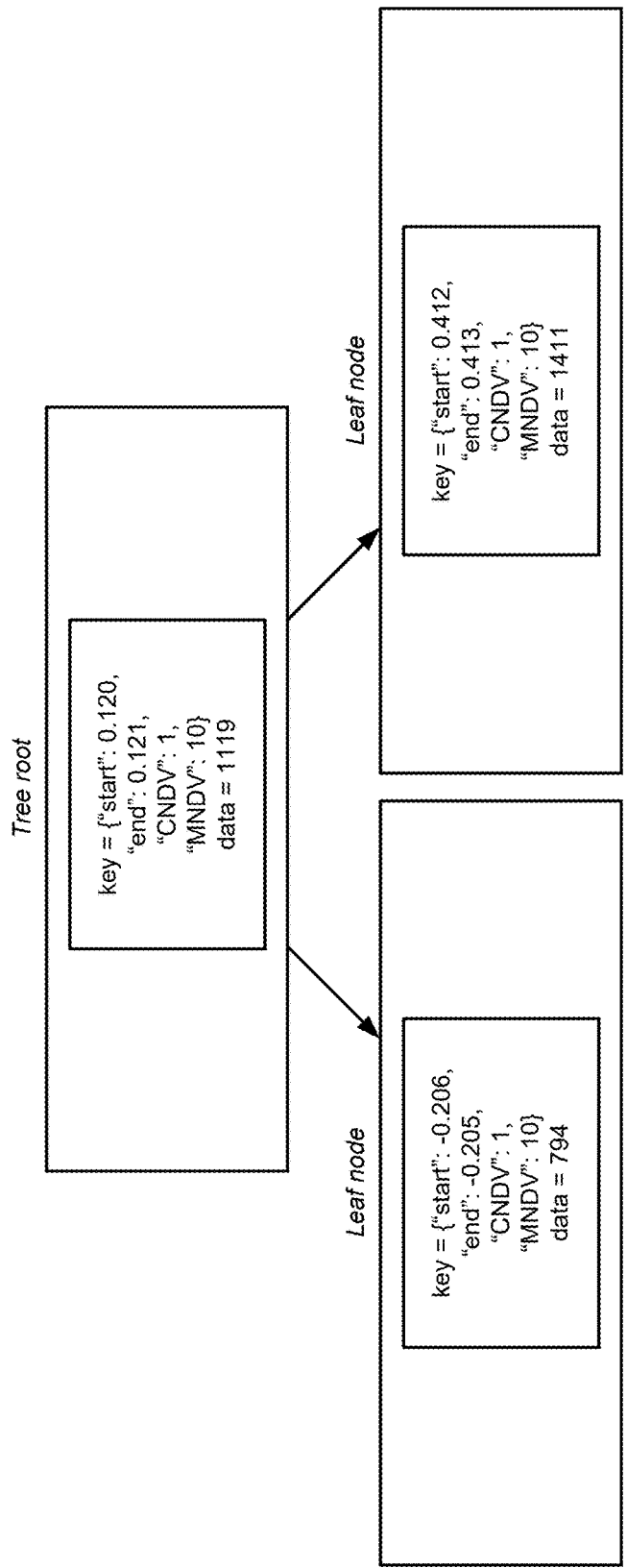

FIG. 3.3

[*Hyperspace Partition Map: Ingest Vectors to Existing B-Tree Keys*]
Step 5: A vector with an X-dimension value of 0.412205 is ingested. An existing key with a range of [0.412, 0.413] can hold this value and no new B-Tree key is needed. The "CNDV" field is updated after the new vector is ingested.
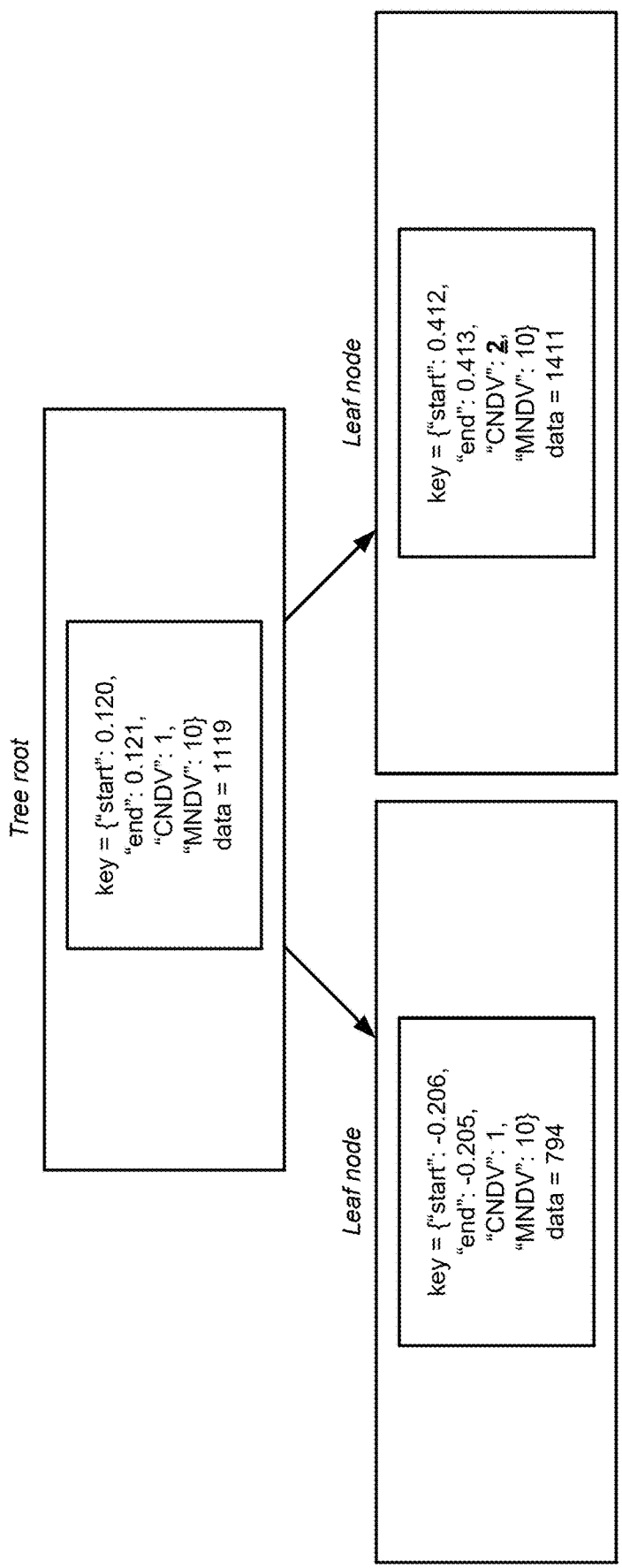
FIG. 3.4

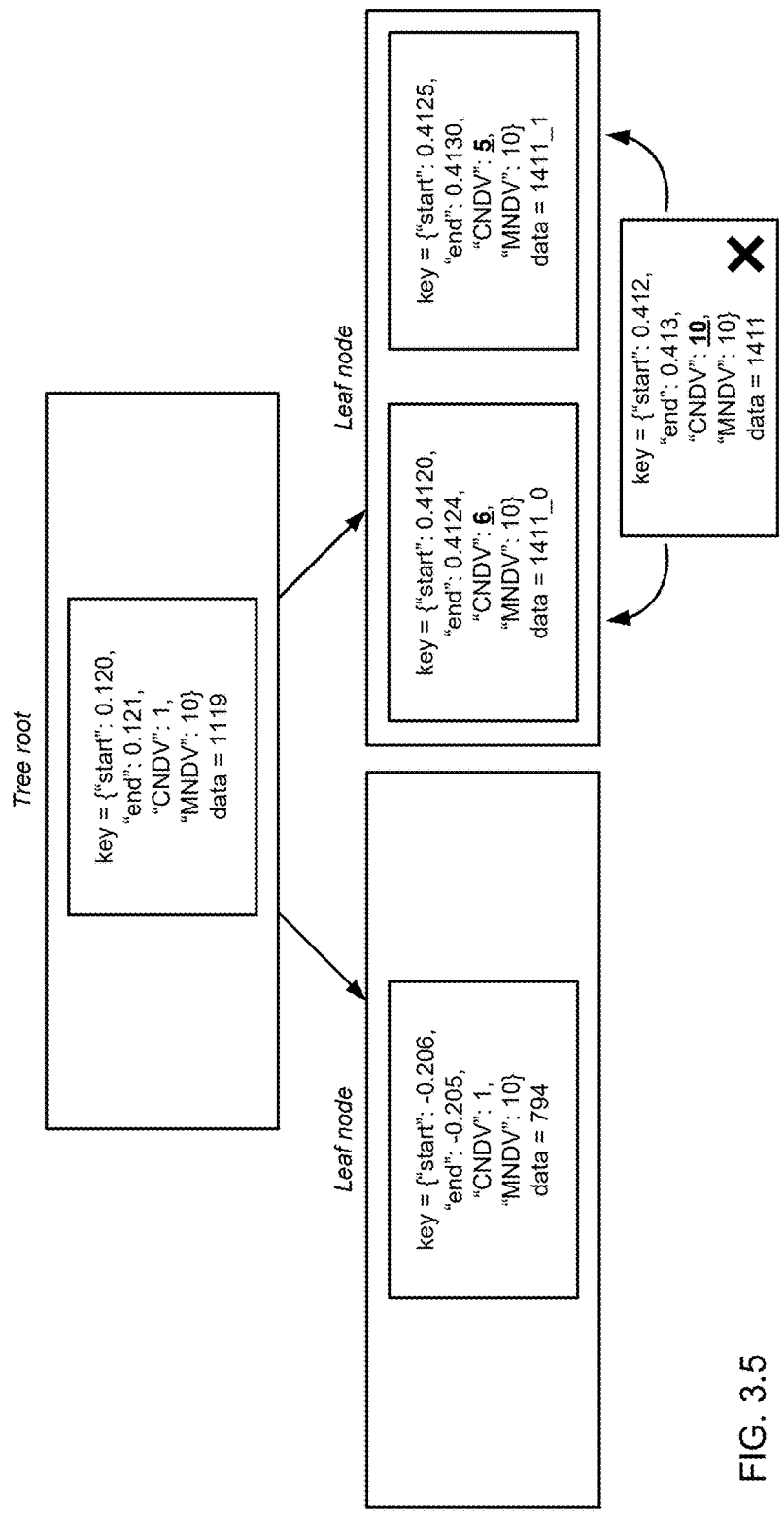
FIG. 3.5

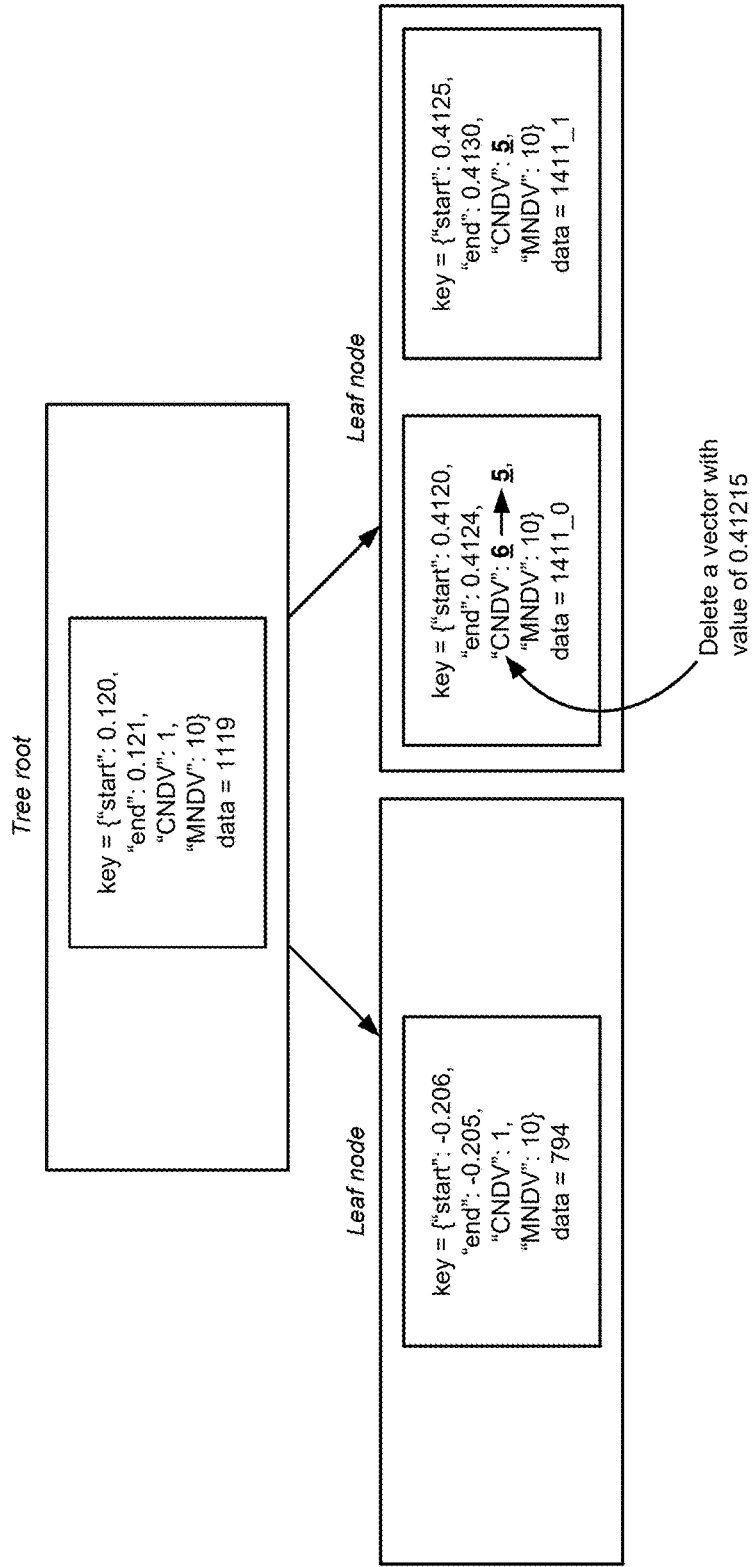
FIG. 3.6

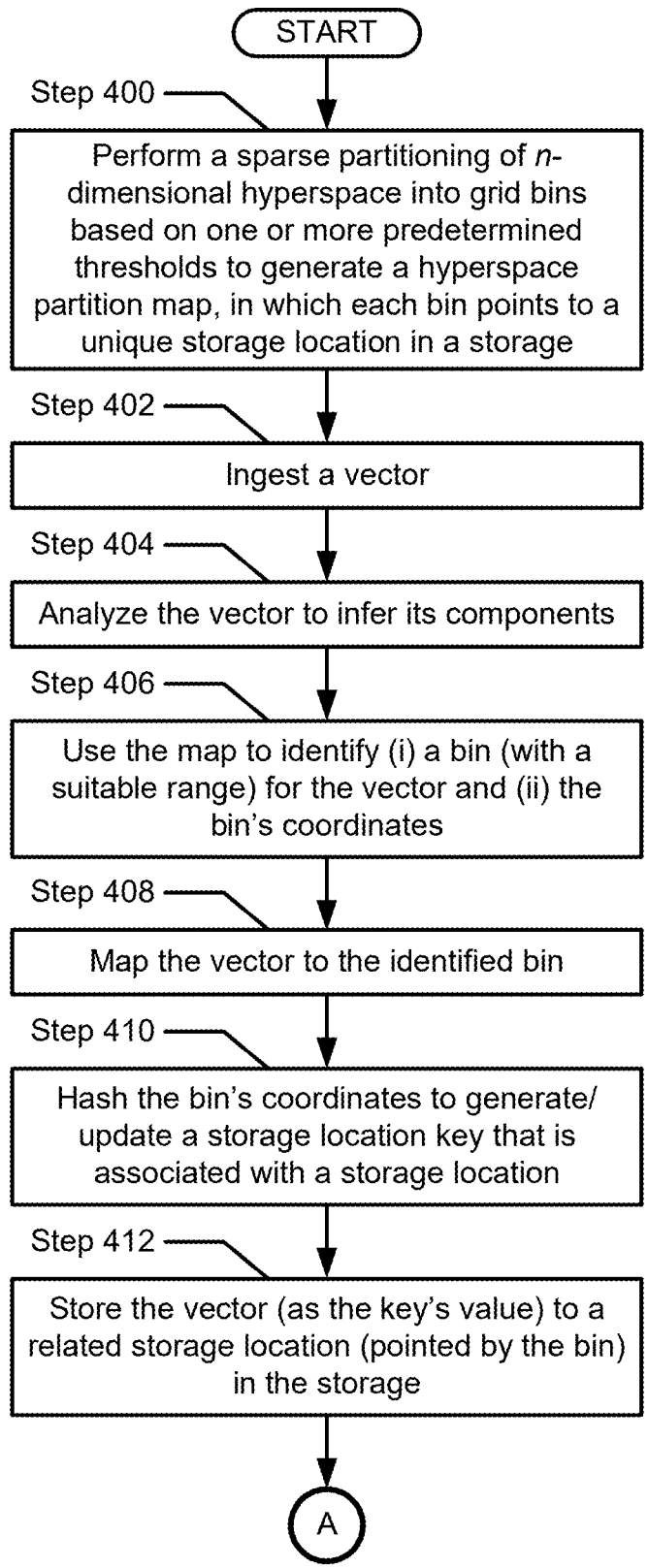
FIG. 4.1

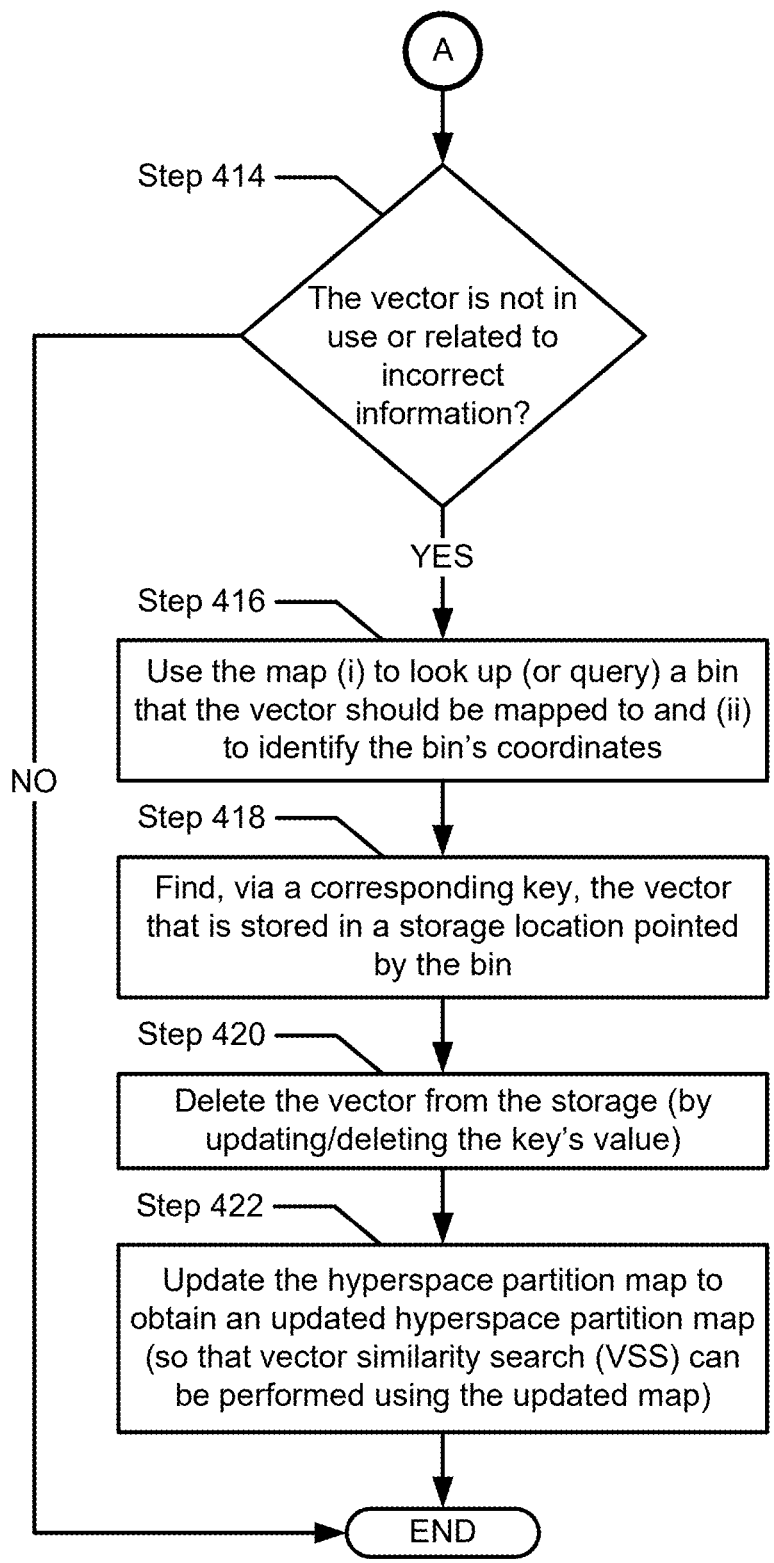
FIG. 4.2

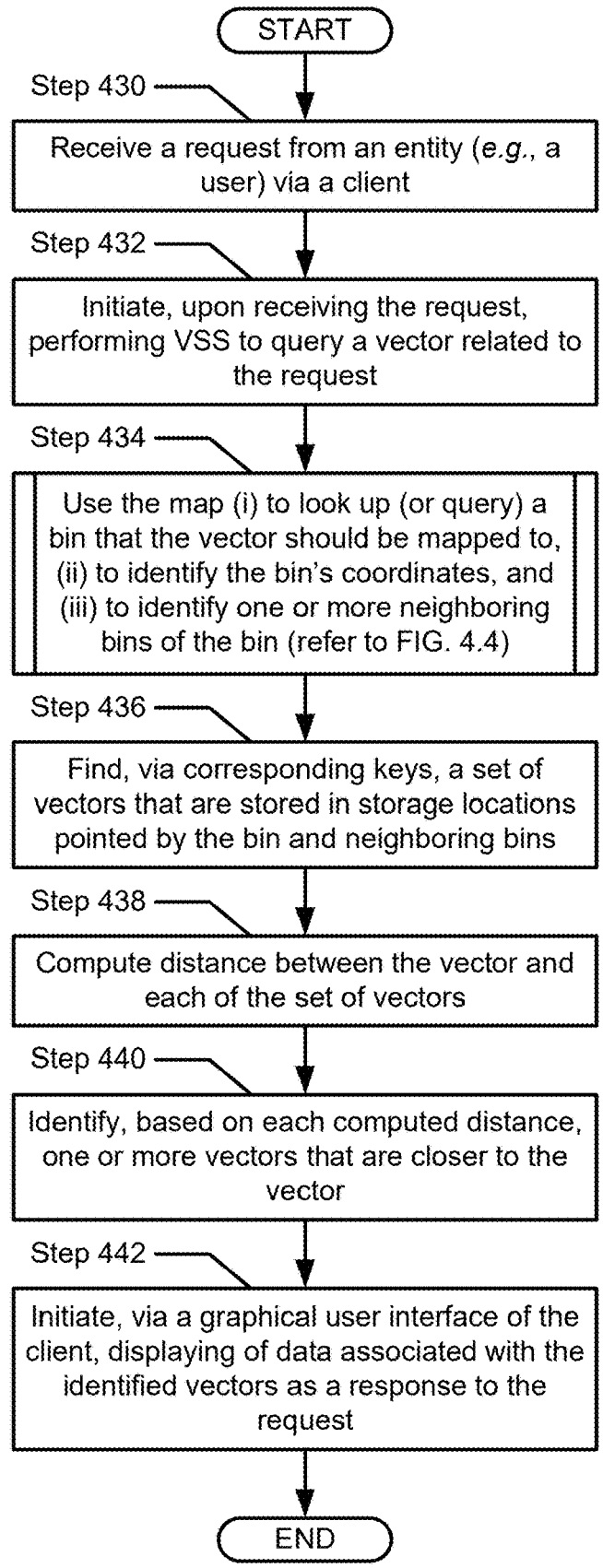
FIG. 4.3

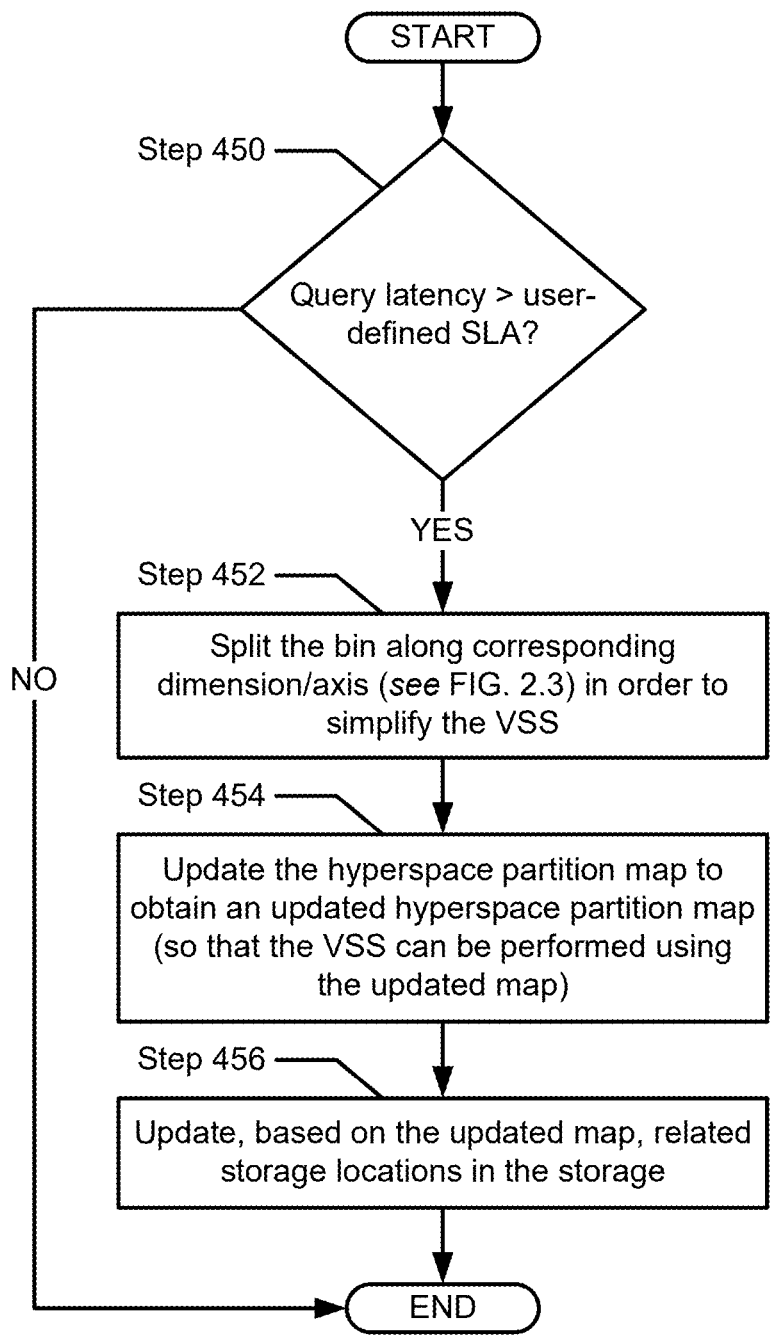
FIG. 4.4

METHOD AND SYSTEM FOR HYPERSPACE SPARSE PARTITION VECTOR SIMILARITY SEARCH

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIG. 2.1 shows an example hyperspace partition in accordance with one or more embodiments disclosed herein.

FIG. 2.2 shows an example hyperspace sparse partition in accordance with one or more embodiments disclosed herein.

FIG. 2.3 shows an example distinguishable value based grid bin split in hyperspace in accordance with one or more embodiments disclosed herein.

FIG. 2.4 shows an example process to illustrate how to map a vector to a hyperspace grid bin and locate a storage location of the vector in accordance with one or more embodiments disclosed herein.

FIG. 2.5 shows an example hyperspace partition map with one or more B-Trees in accordance with one or more embodiments disclosed herein.

FIGS. 3.1-3.2 show an example process to illustrate how to ingest vectors and build a B-Tree in accordance with one or more embodiments disclosed herein.

FIG. 3.3 shows an example process to illustrate how to ingest vectors and perform a B-Tree node split in accordance with one or more embodiments disclosed herein.

FIG. 3.4 shows an example process to illustrate how to ingest vectors to existing B-Tree keys in accordance with one or more embodiments disclosed herein.

FIG. 3.5 shows an example process to illustrate how to ingest vectors and split existing B-Tree keys in accordance with one or more embodiments disclosed herein.

FIG. 3.6 shows an example process to illustrate how to delete a vector and perform a delayed B-Tree key deletion in accordance with one or more embodiments disclosed herein.

FIGS. 4.1-4.4 show a method for performing vector similarity search (VSS) in accordance with one or more embodiments disclosed herein.

DETAILED DESCRIPTION

Figure 1:
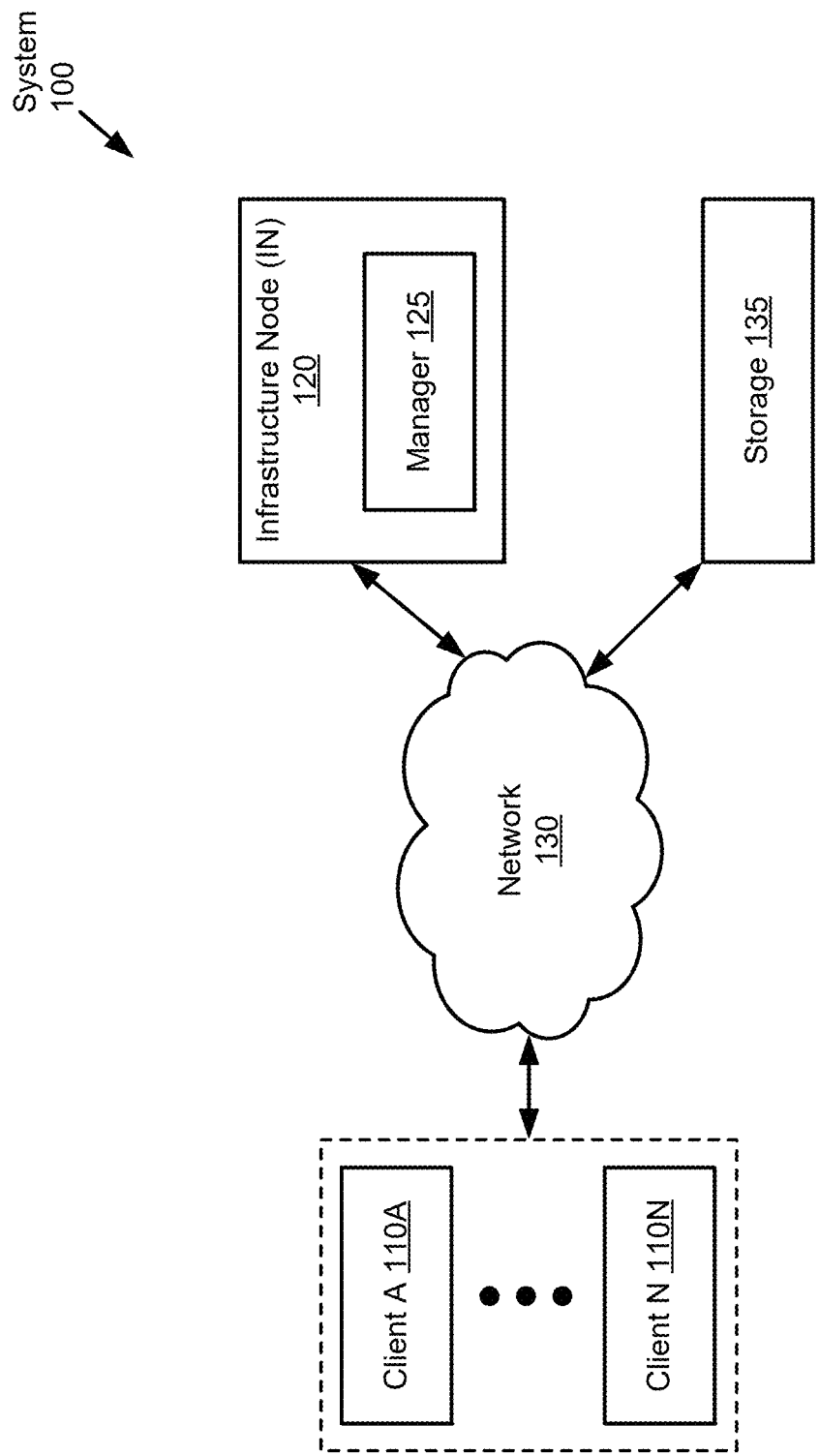
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, VSS is known as a technique that identifies similar data according to their representations (e.g., a method to identify items that are semantically have a similar meaning). This technique is widely used in information retrieval, machine learning (ML) applications, and recommendation systems. In VSS, data (e.g., documents, images, etc.) is represented as vectors in space with many dimensions, in which each dimension represents a specific attribute (e.g., a word, a term, etc.) of the data. With this method of organization, an entity may compare vectors and find similar data among them.

From a different perspective, assume that for a given set of vectors $\{V_1, V_2, \ldots, V_n\}$ and an input query vector "$V_q$", VSS may identify vectors of the set that are closer to $V_q$ using a distance metric approach. Additionally, there are various existing libraries that may provide VSS; however, the complexity of vector indexing and vector search grows with increase in the number of vectors stored in high-dimensional space.

Conventionally, vector indexes (e.g., inverted list indexes, graph indexes, hash indexes, tree indexes, etc.) are built to succinctly describe distance relationships amongst vectors so that VSS can be performed efficiently. For instance, an inverted file index (IVF) is an example of an inverted list index, a hierarchical navigable small world (HNSW) graph is an example of a graph vector index, and approximate nearest neighbors oh yeah (ANNOY) is an example of multi-dimensional tree vector index. As yet another instance, to perform large scale vector search (e.g., with trillion vectors), a combination of index types may be used to further accelerate the search, such as a combination of inverted file index product quantization (IVFPQ) and HNSW.

Currently, different types of vector indexes have different capabilities and are often suited for certain scenarios, in which it is not always straightforward to select an appropriate index type. Further, building/generating an index can be an expensive operation (especially for large number of vectors) and index files can be large, which may lead to complexity in managing, for example, on-disk storage and caching in memory.

For at least the reasons discussed above and without requiring resource-intensive efforts (e.g., time, engineering, etc.), a fundamentally different approach/framework is needed (e.g., a framework that utilizes coordinates of a vector (which already indicate the vector's position in hyperspace) instead of building indexes for vectors, because (i) a vector with n members (mathematically) can be considered as a point in the n-dimensional hyperspace in which each member of the vector is a coordinate/point on one of these dimensions).

Embodiments disclosed herein relate to methods and systems for performing VSS. As a result of the processes discussed below, one or more embodiments disclosed herein advantageously ensure that: (i) n-dimensional hyperspace is partitioned into one or more grid bins, in which each grid bin points to a unique storage location (e.g., a file name in storage, an offset within a file stored in storage, etc.); (ii) an ingested vector is mapped to a corresponding grid bin (of the hyperspace) based on the vector's coordinates; (iii) VSS simply looks up a corresponding grid bin to which a vector should be mapped, and identifies one or more vectors that are already stored in a storage location pointed by the grid bin and one or more neighboring grid bins of the grid bin; (iv) for a better user experience, the framework simplifies VSS by (a) providing a simple index of grid bins (or hyperspace grid bins) using B-Trees, (b) ensuring that each grid bin only contains one or more pointers to storage locations of vectors (where no vectors are stored in grid bins); (v) for a better user experience, the framework provides scalable VSS via sparse implementation of grid bins, in which empty grid bins are not indexed/included in a hyperspace partition map (and not instantiated on storage), so that the "curse of dimensionality" (which is suffered by tree types of indexes) is avoided; (vi) for a better user experience, the framework enables high-performance VSS via B-Trees (where B-Trees provide efficient hyperspace grid bin lookup); and/or (vii) for a better user experience, the framework ensures that vector storage locations are indexed by B-Trees (in order to, at least, support storage space optimization).

The following describes various embodiments disclosed herein.

FIG. 1 shows a diagram of a system (100) in accordance with one or more embodiments disclosed herein. The system (100) includes any number of clients (e.g., Client A (110A), Client N (110N), etc.), a network (130), any number of infrastructure nodes (IN) (e.g., 120), and a storage (135). The system (100) may include additional, fewer, and/or different components without departing from the scope of the embodiments disclosed herein. Each component may be operably/operatively connected to any of the other components via any combination of wired and/or wireless connections. Each component illustrated in FIG. 1 is discussed below.

In one or more embodiments, the clients (e.g., 110A, 110N, etc.), the IN (120), the network (130), and the storage (135) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110N, etc.) and the IN (120) are shown to be operatively connected through a communication network (e.g., 130), the clients (e.g., 110A, 110N, etc.) and the IN (120) may be directly connected (e.g., without an intervening communication network).

Further, the functioning of the clients (e.g., 110A, 110N, etc.) and the IN (120) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of clients (e.g., 110A, 110N, etc.). For example, the system may be configured to organize unbounded, continuously generated data into a data stream. The system (100) may also represent a comprehensive middleware layer executing on computing devices (e.g., 500, FIG. 5) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the IN (120)) from the users. By doing so, the users may utilize different computing devices (e.g., 500, FIG. 5) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110N, etc.) may include functionality to, e.g.: (i) capture sensory input (e.g., sensor data) in the form of text, audio, video, touch or motion, (ii) collect massive amounts of data at the edge of an Internet of Things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (120)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the IN (120). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene/environment), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications (e.g., microservices) installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with the IN (120). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN. When the clients interact with the IN, data that is relevant to the clients may be stored (temporarily or permanently) in the IN.

In one or more embodiments, a client (e.g., 110A, 110N, etc.) may be capable of, e.g.: (i) collecting users' inputs, (ii) correlating collected users' inputs to the computer-implemented services to be provided to the users, (iii) communicating with the IN (120) that perform computations necessary to provide the computer-implemented services, (iv) using the computations performed by the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (120)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be taken into account without departing from the scope of the embodiments disclosed herein.

Figure 5:
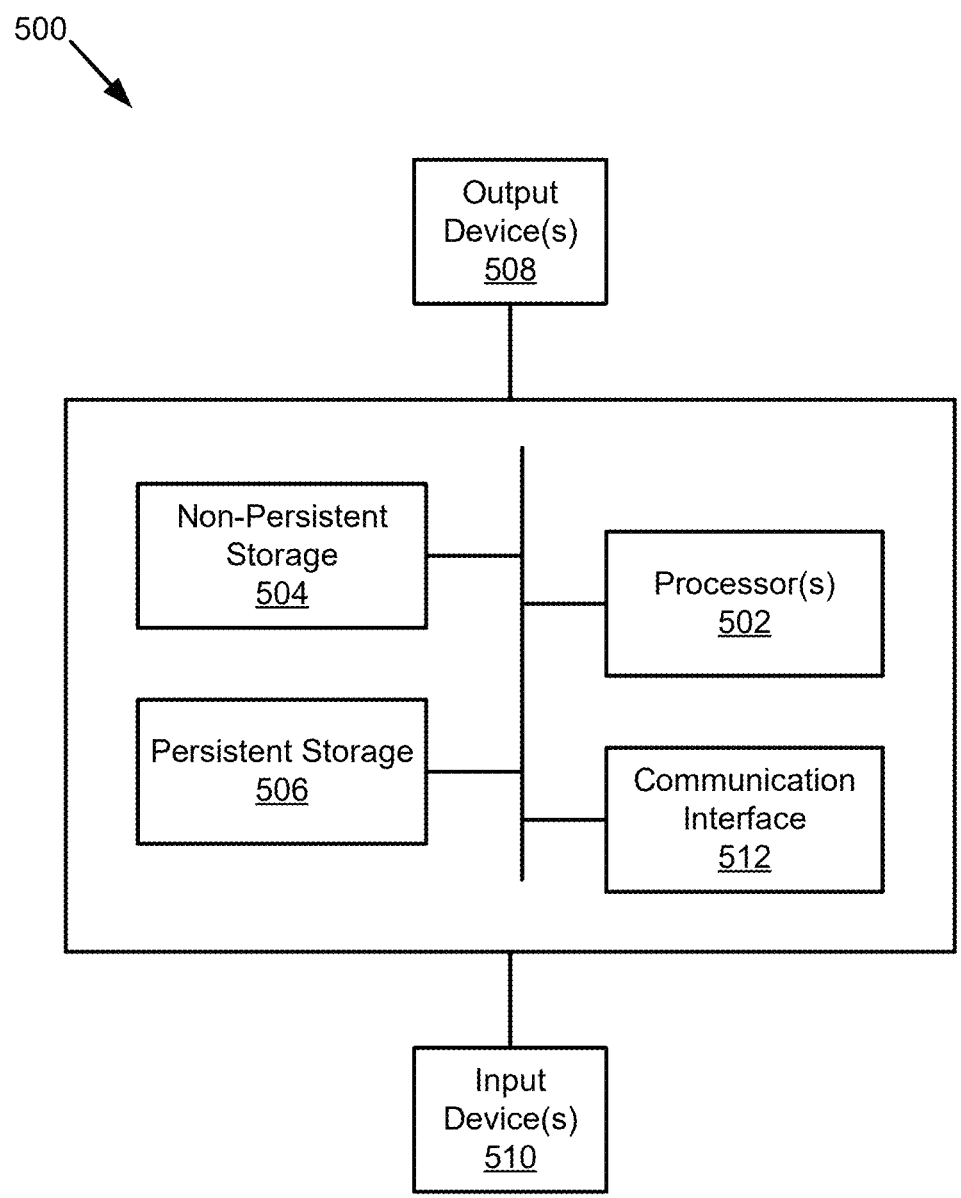
FIG. 5 shows a diagram of a computing device in accordance with one or more embodiments disclosed herein.

Further, in one or more embodiments, a client (e.g., 110A, 110N, etc.) may be implemented as a computing device (e.g., 500, FIG. 5). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., customers, administrators, people, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 500, FIG. 5) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (120) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (120) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the storage (135) for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or ML models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (not shown) for review and/or other human interactions; (x) exchange data with other devices registered in/to the network (130) in order to, for example, participate in a collaborative workload placement (e.g., the node may split up a request (e.g., an operation, a task, an activity, etc.) with another IN, coordinating its efforts to complete the request more efficiently than if the IN had been responsible for completing the request); (xi) provide software-defined data protection for the clients (e.g., 110A, 110N, etc.); (xii) provide automated data discovery, protection, management, and recovery operations for the clients; (xiii) monitor operational states of the clients; (xiv) regularly back up configuration information of the clients to the storage (135); (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or database; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IN (120) may communicate with, for example, the storage (135) and/or other storage devices in the system (100).

As described above, the IN (120) may be capable of providing a range of functionalities/services to the users of the clients (e.g., 110A, 110N, etc.). However, not all of the users may be allowed to receive all of the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (120) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (120) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (120) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

Further, while a single IN (e.g., 120) is considered above, the term "node" includes any collection of systems or sub-systems that individually or jointly execute a set, or multiple sets, of instructions to provide one or more computer-implemented services. For example, a single IN may provide a computer-implemented service on its own (i.e., independently) while multiple other nodes may provide a second computer-implemented service cooperatively (e.g., each of the multiple other nodes may provide similar and or different services that form the cooperatively provided service).

As described above, the IN (120) may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, the IN (120) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

One of ordinary skill will appreciate that the IN (120) may perform other functionalities without departing from the scope of the embodiments disclosed herein.

In one or more embodiments, the IN (120) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN (120) described throughout the application.

Alternatively, in one or more embodiments, similar to a client (e.g., 110A, 110N, etc.), the IN (120) may also be implemented as a logical device.

In one or more embodiments, the IN (120) may host a manager (125), in which the manager (125) may be configured to perform, at least, (in conjunction with the storage (135)) all, or a portion, of the functionalities/steps described in FIGS. 2.1-4.4. One of ordinary skill will appreciate that the manager (125) may perform other functionalities without departing from the scope of the embodiments disclosed herein. The manager (125) may be implemented using hardware (e.g., a physical device including circuitry), software, or any combination thereof.

In the embodiments of the present disclosure, the storage (135) is demonstrated as a separate entity from the IN (120); however, embodiments disclosed herein are not limited as such. The storage (135) may be demonstrated as a part of the IN (e.g., as deployed to the IN).

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IN through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

Turning now to the storage (135), the storage (135) may provide long-term, durable, high read/write throughput data storage/protection with near-infinite scale and low-cost. The storage (135) may be a fully managed cloud/remote (or local) storage (e.g., pluggable storage, object storage, block storage, file system storage, data stream storage, Web servers, unstructured storage, a database, a key-value store, etc.) that acts as a shared storage/memory resource that is functional to store unstructured and/or structured data. Further, the storage (135) may also occupy a portion of a physical storage/memory device or, alternatively, may span across multiple physical storage/memory devices.

In one or more embodiments, the storage (135) may be implemented using physical devices that provide data storage services (e.g., storing data and providing copies of previously stored data). The devices that provide data storage services may include hardware devices and/or logical devices. For example, the storage (135) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the storage (135) may include a memory device (e.g., a dual in-line memory device), in which data is stored and from which copies of previously stored data are provided. As yet another example, the storage (135) may include a persistent storage device (e.g., an SSD), in which data is stored and from which copies of previously stored data is provided. As yet another example, the storage (135) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the storage (135) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the storage (135) may store/record unstructured and/or structured data that may include (or specify), for example (but not limited to): an identifier of a user/customer (e.g., a unique string or combination of bits associated with a particular user); a request received from a user (or a user's account); a geographic location (e.g., a country) associated with the user; a timestamp showing when a specific request is processed by an application; a port number (e.g., associated with a hardware component of a client (e.g., 110A)); a protocol type associated with a port number; computing resource details (including details of hardware components and/or software components) and an IP address of an IN (e.g., 120) hosting an application where a specific request is processed; an identifier of an application; information with respect to historical metadata (e.g., system logs, applications logs, telemetry data including past and present device usage of one or more computing devices in the system (100), etc.); computing resource details and an IP address of a client that sent a specific request (e.g., to the IN (120)); one or more points-in-time and/or one or more periods of time associated with a data recovery event; data for execution of applications/services (including IN applications and associated endpoints); corpuses of annotated data used to build/generate and train processing classifiers for trained ML models; linear, non-linear, and/or ML model parameters (e.g., instructions to the manager (125) on how to train and/or fine-tune a model); an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; a distributed model identifier that uniquely identifies a distributed model; a user activity performed on a data item; a cumulative history of user/administrator activity records obtained over a prolonged period of time; a setting (and a version) of a mission critical application executing on an IN (e.g., 120); an SLA/SLO set by a user; a data protection policy (e.g., an affinity-based backup policy) implemented by a user (e.g., to protect a local data center, to perform a rapid recovery, etc.); a configuration setting of that policy; product configuration information associated with a client; a number of each type of a set of assets protected by an IN (e.g., 120); a size of each of the set of assets protected; a number of each type of a set of data protection policies implemented by a user; configuration information associated with the manager (125) (to manage security, network traffic, network access, or any other function/operation performed by the manager); a job detail of a job (e.g., a data protection job, a data restoration job, a log retention job, etc.) that has been initiated by an IN (e.g., 120); a type of the job (e.g., a non-parallel processing job, a parallel processing job, an analytics job, etc.); information associated with a hardware resource set (discussed below) of the IN (120); a completion timestamp encoding a date and/or time reflective of a successful completion of a job; a time duration reflecting the length of time expended for executing and completing a job; a backup retention period associated with a data item (e.g., a file, a folder, etc.); a status of a job (e.g., how many jobs are still active, how many jobs are completed, etc.); a number of requests handled (in parallel) per minute (or per second, per hour, etc.) by the manager (125); a number of errors encountered when handling a job; a documentation that shows how the manager (125) performs against an SLO and/or an SLA; information regarding an administrator (e.g., a high priority trusted administrator, a low priority trusted administrator, etc.) related to an analytics job; a workflow (e.g., a policy that dictates how a workload should be configured and/or protected, such as a structured query language (SQL) workflow dictates how an SQL workload should be protected) set (by a user); a type of a workload that is tested/validated by an administrator per data protection policy; a practice recommended by a vendor (e.g., a single data protection policy should not protect more than 100 assets; for a dynamic NAS, maximum one billion files can be protected per day, etc.); one or more device state paths corresponding to a device (e.g., a client); an existing knowledge base (KB) article; a technical support history documentation of a customer/user; a port's user guide; a port's release note; a community forum question and its associated answer; a catalog file of an application upgrade; details of a compatible OS version for an application upgrade to be installed; an application upgrade sequence; a solution or a workaround document for a software failure; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/customer experience; one or more vectors that are associated with images, documents/articles, and videos (e.g., that would reflect a user's daily life and activities) from any source; a hyperspace partition map (specifying one or more B-Trees, in which each dimension of related n-dimensional hyperspace may have a separate B-Tree), etc.

In one or more embodiments, memory may store one or more hyperspace partition maps; however, as being a key-value store and to provide data resilience, the storage (135) may store the hyperspace partition maps. To this end, to enable multi-tenancy, one or more databases (e.g., vector databases) may be generated (via hyperspace sparse partition) in the storage (135), in which each vector database may be represented with a unique database identifier (e.g., "Database-1", "Database-2", etc.). Further, a related database identifier may be prefixed to all keys of that database in order to isolate/distinguish the database from other databases in the storage. For example, {"Database-1": "Partition Map"}: {"Database-1: 1:9a6ef0b0": "vector list"}, {"Database-1:1: d47b118e": "vector list"} . . . {"Database-1: 1:8d3fe456": "vector list"}, in which "1:9a6ef0b0" indicates a hash value of related grid bin coordinates (see e.g., FIG. 2.1).

In one or more embodiments, information associated with a hardware resource set (e.g., including at least resource related parameters) may specify, for example (but not limited to): a configurable CPU option (e.g., a valid/legitimate vCPU count per IN in the system (100)), a configurable network resource option (e.g., enabling/disabling single-root input/output virtualization (SR-IOV) for the IN (120)), a configurable memory option (e.g., maximum and minimum memory per IN in the system (100)), a configurable GPU option (e.g., allowable scheduling policy and/or virtual GPU (vGPU) count combinations per IN in the system (100)), a configurable DPU option (e.g., legitimacy of disabling inter-integrated circuit (I2C) for various INs in the system (100)), a configurable storage space option (e.g., a list of disk cloning technologies across one or more INs in the system (100)), a configurable storage input/output (I/O) option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QOS) template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per analytics engine, a virtual NIC (vNIC) count per IN in the system (100), a wake on LAN support configuration (e.g., supported/enabled, not supported/disabled, etc.), a vGPU count per IN in the system (100), a type of a vGPU scheduling policy (e.g., a "fixed share" vGPU scheduling policy), a storage mode configuration (e.g., an enabled high-performance storage array mode), etc.

In one or more embodiments, as being telemetry data, a system log (e.g., a file that records system activities across hardware and/or software components of a client, an internal lifecycle controller log (which may be generated as a result of internal testing of a NIC), etc.) may include (or specify), for example (but not limited to): a type of an asset (e.g., a type of a workload such as an SQL database, a NAS executing on-premises, a VM executing on a multi-cloud infrastructure, etc.) that is utilized by a user; computing resource utilization data (or key performance metrics including estimates, measurements, etc.) (e.g., data related to a user's maximum, minimum, and average CPU utilizations, an amount of storage or memory resource utilized by a user, an amount of networking resource utilized by user to perform a network operation, etc.) regarding computing resources of a client (e.g., 110A); an alert that is triggered in a client (e.g., based on a failed cloud disaster recovery operation (which is initiated by a user), the client may generate a failure alert); an important keyword associated with a hardware component of a client (e.g., recommended maximum CPU operating temperature is 75° C.); a computing functionality of a microservice (e.g., Microservice A's CPU utilization is 26%, Microservice B's GPU utilization is 38%, etc.); an amount of storage or memory resource (e.g., stack memory, heap memory, cache memory, etc.) utilized by a microservice (e.g., executing on a client); a certain file operation performed by a microservice; an amount of networking resource utilized by a microservice to perform a network operation (e.g., to publish and coordinate inter-process communications); an amount of bare metal communications executed by a microservice (e.g., I/O operations executed by the microservice per second); a quantity of threads (e.g., a term indicating the quantity of operations that may be handled by a processor at once) utilized by a process that is executed by a microservice; an identifier of a client's manufacturer; media access control (MAC) information of a client; an amount of bare metal communication executed by a client (e.g., I/O operations executed by a client per second); etc.

In one or more embodiments, an alert (e.g., a predictive alert, a proactive alert, a technical alert, etc.) may be defined by a vendor of a corresponding client (e.g., 110A), by an administrator, by another entity, or any combination thereof. In one or more embodiments, an alert may specify, for example (but not limited to): a medium-level of CPU overheating is detected, a recommended maximum CPU operating temperature is exceeded, etc. Further, an alert may be defined based on a data protection policy.

In one or more embodiments, an important keyword may be defined by a vendor of a corresponding client (e.g., 110A), by a technical support specialist, by the administrator, by another entity, or any combination thereof. In one or more embodiments, an important keyword may be a specific technical term or a vendor specific term that is used in a system log.

In one or more embodiments, as being telemetry data, an application log may include (or specify), for example (but not limited to): a type of a file system (e.g., a new technology file system (NTFS), a resilient file system (ReFS), etc.); a product identifier of an application; a version of an OS that an application is executing on; a display resolution configuration of a client; a health status of an application (e.g., healthy, unhealthy, etc.); warnings and/or errors reported for an application; a language setting of an OS; a setting of an application (e.g., a current setting that is being applied to an application either by a user or by default, in which the setting may be a font option that is selected by the user, a background setting of the application, etc.); a version of an application; a warning reported for an application (e.g., unknown software exception (0xc00d) occurred in the application at location 0x0007d); a type of an OS (e.g., a workstation OS); an amount of storage used by an application; a size of an application (size (e.g., 5 Megabytes (5 MB), 5 GB, etc.) of an application may specify how much storage space is being consumed by that application); a type of an application (a type of an application may specify that, for example, the application is a support, deployment, or recycling application); a priority of an application (e.g., a priority class of an application, described below); active and inactive session counts; etc.

As used herein, "unhealthy" may refer to a compromised health state (e.g., an unhealthy state), indicating a corresponding entity (e.g., a hardware component, a client, an application, etc.) has already or is likely to, in the future, be no longer able to provide the services that the entity has previously provided. The health state determination may be made via any method based on the aggregated health information without departing from the scope of the embodiments disclosed herein.

In one or more embodiments, a priority class may be based on, for example (but not limited to): an application's tolerance for downtime, a size of an application, a relationship (e.g., a dependency) of an application to other applications, etc. Applications may be classified based on each application's tolerance for downtime. For example, based on the classification, an application may be assigned to one of three classes such as Class I, Class II, and Class III. A "Class I" application may be an application that cannot tolerate downtime. A "Class II" application may be an application that can tolerate a period of downtime (e.g., an hour or other period of time determined by an administrator or a user). A "Class III" application may be an application that can tolerate any amount of downtime.

In one or more embodiments, metadata (e.g., system logs, application logs, etc.) may be obtained (or dynamically fetched) as they become available (e.g., with no user manual intervention), or by the manager (125) polling a corresponding client (e.g., 110A) (by making schedule-driven/periodic application programming interface (API) calls to the client without affecting the client's ongoing production workloads) for newer metadata. Based on receiving the API calls from the analyzer, the client may allow the analyzer to obtain the metadata.

In one or more embodiments, the metadata may be obtained (or streamed) continuously as they generated, or they may be obtained in batches, for example, in scenarios where (i) the manager (125) receives a metadata analysis request (or a health check request for a client), (ii) another IN of the system (100) accumulates the metadata and provides them to the analyzer at fixed time intervals, or (iii) the storage (135) stores the metadata and notify the analyzer to access the metadata from the database. In one or more embodiments, metadata may be access-protected for a transmission from a corresponding client (e.g., 110A) to the manager (125), e.g., using encryption.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the storage (135), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by vendors) and/or by the administrators based on, for example, newer (e.g., updated) versions of external information. The unstructured and/or structured data may also be updated when, for example (but not limited to): newer system logs are received, a state of the manager (125) is changed, etc.

While the storage (135) has been illustrated and described as including a limited number and type of data, the storage (135) may store additional, less, and/or different data without departing from the scope of the embodiments disclosed herein. One of ordinary skill will appreciate that the storage (135) may perform other functionalities without departing from the scope of the embodiments disclosed herein.

While FIG. 1 shows a configuration of components, other system configurations may be used without departing from the scope of the embodiments disclosed herein.

Turning now to FIG. 2.1, FIG. 2.1 shows an example hyperspace partition in accordance with one or more embodiments disclosed herein. The example (or the example scenario), illustrated in FIG. 2.1 and described below, is explanatory purposes only and not intended to limit the scope disclosed herein.

In one or more embodiments, the manager (e.g., 125, FIG. 1) may include functionality to partition n-dimensional hyperspace into one or more grid bins, in which (i) the n-dimensional hyperspace may include, for example, a first dimension, a second dimension, and a third dimension, and (ii) the first dimension includes/hosts a first grid bin, a second grid bin, and a third grid bin.

Referring to FIG. 2.1, the manager may partition given hyperspace (where "X_max: 2.5", "X_min: −2.5", "Y_max: 1.2", and "Y_min: −1.2") into 80 grid bins (in total), based on, for example, user-defined grid bin sizes (e.g., X dimension grid bin size: 0.5, Y dimension grid bin size: 0.3, etc.). In one or more embodiments, a user may define grid bin sizes indirectly (or may provide grid bin size directly to the manager (e.g., 125, FIG. 1) via a client (e.g., 110A, FIG. 1)) based on his/her intention about how many vectors each grid bin should represent (for example, in order to comply with a query latency related SLA and/or in order to minimize vector query latency).

In one or more embodiments, the manager (e.g., 125, FIG. 1) may include functionality to track the hyperspace in order to infer how each vector is mapped to the hyperspace (by utilizing coordinates of a corresponding vector, which already indicate the vector's position in the hyperspace), not how many vectors are there in the hyperspace. For example and referring to FIG. 2.1, the manager may infer that Vector 1 ($V_1$ (−0.31, 0.84), illustrated by a dashed line arrow) is mapped to Bin (4, 1), because $V_1$ may be considered as a point in the hyperspace where each member/component of $V_1$ is a coordinate of one of the dimensions of the hyperspace. As yet another example and referring to FIG. 2.1, the manager may infer that Vector 2 ($V_2$ (1.63, 0.45), illustrated by a dashed line arrow) is mapped to Bin (8, 2), because $V_2$ may be considered as a point in the hyperspace where each component of $V_2$ is a coordinate of one of the dimensions of the hyperspace.

Further, assuming that the overall size of the hyperspace is not changing, as the number of ingested vectors is increased and/or coordinates of an ingested vector is increased, the manager may re-partition the hyperspace to accommodate these changes, by, for example, splitting a corresponding grid bin(s) (see FIGS. 2.2-2.3).

Turning now to FIG. 2.2, FIG. 2.2 shows an example hyperspace sparse partition in accordance with one or more embodiments disclosed herein. The example (or the example scenario), illustrated in FIG. 2.2 and described below, is explanatory purposes only and not intended to limit the scope disclosed herein.

Referring to FIG. 2.2, the manager (e.g., 125, FIG. 1) may partition n-dimensional hyperspace into one or more grid bins, in which (i) each grid bin is represented by a rectangular box, (ii) each grid bin represents corresponding storage space/location in the storage (e.g., 135, FIG. 1), (iii) each vector is represented by "x", (iv) each grid bin may have none or at least one pointer to a storage location of vectors mapped to the grid bin, and (v) none of the grid bins includes an actual vector.

In one or more embodiments, the manager (e.g., 125, FIG. 1) may perform sparse hyperspace partition and may not instantiate an empty grid bin (e.g., a grid bin that does not include a pointer related to any vector) in memory or in the storage (e.g., 135, FIG. 1). To perform the sparse hyperspace partition, the manager (i) may need to have prior knowledge of rough coordinate value ranges of each vector and (ii) may require default sizes of each grid bin on each dimension (e.g., a default bin size along Y-dimension, a default bin size along X-dimension, etc.) to be set, thus may require a default set of grid bin coordinates for each grid bin.

In one or more embodiments, as indicated by a curved arrow, the manager (e.g., 125, FIG. 1) may split an overpopulated grid bin in order to maintain a maximum number of vectors represented/pointed in a corresponding grid bin (e.g., maximum 50 vectors can be mapped to a particular grid bin) or to comply with a query latency related SLA). In one or more embodiments, a grid bin may be overpopulated because similar vectors that have coordinates close to each other are mapped to the grid bin.

For example, the manager (e.g., 125, FIG. 1) may start partitioning the hyperspace into large size grid bins. As more and more vectors are mapped to a particular grid bin (because more and more vectors are ingested by the manager), the manager may split that grid bin in order to comply with a query latency related SLA. As yet another example, as less and less vectors are mapped to a particular grid bin (because one or more vectors get deleted from corresponding storage locations by the manager), the manager may combine corresponding grid bins into one or more grid bins in order to comply with the query latency related SLA.

Turning now to FIG. 2.3, FIG. 2.3 shows an example distinguishable value based grid bin split in hyperspace in accordance with one or more embodiments disclosed herein. The example (or the example scenario), illustrated in FIG. 2.3 and described below, is explanatory purposes only and not intended to limit the scope disclosed herein.

In one or more embodiments, upon receiving a request (e.g., a data search request) from a user (via a client (e.g., 110A, FIG. 1)), the manager (e.g., 125, FIG. 1) may perform VSS to query a vector (in the storage (e.g., 135, FIG. 1)) related to the request. While performing the VSS, the manager (e.g., 125, FIG. 1) may identify a set of vectors that fall into related grid bins (including one or more neighboring grid bins of a main candidate grid bin). Thereafter, the manager (e.g., 125, FIG. 1) may compute distance between the vector and each of the set of vectors (e.g., may perform brute-force computation of distances between the vector and each of the set of vectors).

While computing distance between the vector and each of the set of vectors, if the manager (e.g., 125, FIG. 1) dynamically determines, via a model (e.g., a linear model, a non-linear model, an ML model, etc.), that the computation becomes longer than a user-defined query latency related SLA (e.g., becomes time consuming), the manager may split that grid bin in order to comply with the SLA.

Referring to FIG. 2.3 and assuming that the SLA specifies "maximum ten vectors can be mapped to a particular grid bin", the manager (e.g., 125, FIG. 1) may split an overpopulated grid bin in order to maintain a maximum number of vectors represented by a corresponding grid bin and to simplify VSS. To this end, as being an overpopulated grid bin, the manager (e.g., 125, FIG. 1) may split Grid A (in Y-dimension) into two grid bins because (i) eleven vectors (or distinguishable values from Y-dimension's perspective) are mapped to Grid A in Y-dimension, which exceeds the SLA threshold, and (ii) Grid A has four distinguishable values from X-dimension's perspective (and there is no need to split Grid A in X-dimension).

Turning now to FIG. 2.4, FIG. 2.4 shows an example process to illustrate how to map a vector to a hyperspace grid bin and locate a storage location of the vector in accordance with one or more embodiments disclosed herein. The example (or the example scenario), illustrated in FIG. 2.4 and described below, is explanatory purposes only and not intended to limit the scope disclosed herein.

Referring to FIG. 2.4, assume here that Vector X is ($x_0$, $x_1$ ... $x_K$ ... $x_M$) and Bin A's coordinates are ($a_0$, $a_1$ ... $a_K$ ... $a_M$) on hyperspace. As indicated, the manager (e.g., 125, FIG. 1) may efficiently search for a grid bin (e.g., Bin A) with a suitable range on a specific dimension of the hyperspace for each component of Vector X (e.g., $x_0$, $x_1$, $x_K$, $x_M$, etc.) to fit, and manage grid bin split/merge processes on the specific dimension. Thereafter, the manager (e.g., 125, FIG. 1) may map, for example, $x_0$ to $a_0$, $x_1$ to $a_1$, $x_K$ to $a_K$, and $x_M$ to $a_M$.

The manager (e.g., 125, FIG. 1) may then generate a key (e.g., storage location KEY_A), using its hash calculation mechanism, from Bin A's coordinates. As indicated, the manager may hash Bin A's coordinates (e.g., a string) into KEY_A, in which, based on the "key-value store" functionality of the storage (e.g., 135, FIG. 1), KEY_A's value is indeed Vector X. Said another way, once the manager (e.g., 125, FIG. 1) locates a grid bin (and its coordinates) based on an ingested vector, the manager may generate a key (e.g., a hash value, a cryptographic fingerprint, etc.) by hashing the grid bin's coordinates and then populate a lookup table (maintained by the storage (e.g., 135, FIG. 1)) to store the key and the vector (so that, for example, once the vector is queried by a user at a later point-in-time, the manager may use the lookup table and the key to easily retrieve the vector (e.g., the value of that key) that is stored in that grid bin (e.g., in that storage location)).

In one or more embodiments, the storage location may be, for example (but not limited to): a block location/namespace in the storage (e.g., 135, FIG. 1), an offset within a file stored in the storage, an identifier of a file/object in the storage, etc. Further, in order to perform a hashing operation, the hash calculation mechanism may use/employ, for example (but not limited to): the secure hash algorithm (SHA)-1 model, a rolling hash function, the message-digest algorithm 5 (MD5) model, etc.

Turning now to FIG. 2.5, FIG. 2.5 shows an example hyperspace partition map with one or more B-Trees in accordance with one or more embodiments disclosed herein. The example (or the example scenario), illustrated in FIG. 2.5 and described below, is explanatory purposes only and not intended to limit the scope disclosed herein.

Referring to FIG. 2.5, assume here that Vector X is ($x_0$, $x_1$ ... $x_K$ ... $x_M$) and Bin A's coordinates are ($a_0$, $a_1$ ... $a_K$ ... $a_M$) on hyperspace. Further, a hyperspace partition map may be represented by one or more B-Trees (or a forest of B-Trees), in which each B-Tree may include (or specify), for example (but not limited to): a root node (see e.g., FIG. 3.3), one or more internal nodes, one or more leaf nodes (see e.g., FIG. 3.3), etc.

As indicated, each dimension of hyperspace may have its B-Tree (where each B-Tree may operate independently) so that the manager (e.g., 125, FIG. 1) may use a corresponding B-Tree(s) to efficiently search/track which "hyperspace" grid bin(s) (e.g., Bin A) on a particular dimension/coordinate has, for example, a pointer related to a component of queried vector (e.g., Vector X). Said another way, the manager (e.g., 125, FIG. 1) may find a grid bin related to each component of a particular vector by looking up each of the B-Trees (of the hyperspace partition map) independently to identify coordinates of related grid bins. To this end, the manager (e.g., 125, FIG. 1) may map, for example, $x_0$ to $a_0$, $x_1$ to $a_1$, $x_K$ to $a_K$, and $x_M$ to $a_M$.

Further, as discussed above, no vector (or vector data) is stored in a grid bin of the hyperspace, in which a grid bin (e.g., Bin A) may just include a pointer (to a storage location in the storage (e.g., 135, FIG. 1)) related to a component of a vector (e.g., Vector X). In this way, the hyperspace partition map may be kept small enough to be stored to memory and/or to the storage, even for large dimensional vectors.

The manager (e.g., 125, FIG. 1) may then generate a key (e.g., storage location KEY_A), using its hash calculation mechanism, from Bin A's coordinates. As indicated, the manager may hash Bin A's coordinates (e.g., a string) into KEY_A, in which, based on the "key-value store" functionality of the storage (e.g., 135, FIG. 1), KEY_A's value is indeed Vector X. Said another way, once the manager (e.g., 125, FIG. 1) locates a grid bin (and its coordinates) based on an ingested vector, the manager may generate a key (e.g., a hash value, a cryptographic fingerprint, etc.) by hashing the grid bin's coordinates and then populate a lookup table (maintained by the storage (e.g., 135, FIG. 1)) to store the key and the vector (so that, for example, once the vector is queried by a user at a later point-in-time, the manager may use the lookup table and the key to easily retrieve the vector (e.g., the value of that key) that is stored in that grid bin (e.g., in that storage location)).

In one or more embodiments, a key in a B-Tree (see e.g., FIG. 3.1) may be a range key corresponding to a grid bin (on a particular hyperspace dimension, where each dimension has its own grid bins) with the following data structure (where one or more comparison operators (e.g., greater than, less than, etc.) can be defined based on key's range): (i) "dimension start" and "dimension end" values of the grid bin, (ii) a current number of distinguishable values (CNDV) in the grid bin, (iii) a maximum number of distinguishable values (MNDV) in the grid bin (if the values are indistinguishable (e.g., the same value) from a "dimension-based" grid bin splitting perspective, then the values can be considered as one value (which means there is no need to split a related grid bin)), and/or (iv) a distinguishable value may have one or more customized definitions, for example, a distinguishable value may be defined as a value difference that is less than a threshold (if the threshold is 0.001 and value differences of a set of vectors along a dimension is less than 0.001, then the set of vectors (along that dimension) can be considered as one vector).

In one or more embodiments, data (for the key) in a B-Tree (see e.g., FIG. 3.1) may be the grid bin's coordinates in a particular dimension, in which the data may be used together with grid bin coordinates (in other dimensions) of a related vector, in order to point to a storage location (in the storage (e.g., 135, FIG. 1)) of vectors stored in the grid bin.

Referring to FIGS. 2.1 and 2.2, a grid bin may have a default size (e.g., set by a user) in each hyperspace dimension. For example, a default size along X-dimension may be defined as: default size=(X_max−X_min)/sqrt (maximum number of supported vectors). As indicated, each grid bin may have a maximum number of vectors that it can support/point and, if more vectors are mapped to a particular grid bin, that grid bin may need to be split into, for example, two smaller grid bins with non-overlapping coordinate boundaries. Further, in some cases, not all grid bins may need to be split. For example, some dimensions of the hyperspace may have a large number of indistinguishable values and, because of that, only the principal dimensions (of the hyperspace) may need to be split.

FIGS. 3.1-3.2 show an example process to illustrate how to ingest vectors and build a B-Tree in accordance with one or more embodiments disclosed herein. The example (or the example scenario), illustrated in FIGS. 3.1-3.2 and described below, is explanatory purposes only and not intended to limit the scope disclosed herein.

Turning now to FIG. 3.1, FIG. 3.1 illustrates how to construct a B-Tree. Assume here that (i) X-dimension (of hyperspace) has a value range of "−1.0" and "1.0", with a default grid bin size of 0.001 (e.g., supporting million vectors) and (ii) the B-Tree has an order of two, in which each bin has MNDV of ten.

Further, assume here that, at Step 1, the B-Tree is empty, which means no vector is ingested (e.g., by the manager (e.g., 125, FIG. 1)). Then, in Step 2, a vector with an X-dimension value of 0.12035 is ingested. Because there is no key (in the B-Tree) that can hold the ingested vector, a newer key (i.e., a newer grid bin) needs to be inserted to the empty B-Tree. As indicated by a tree root node of the B-Tree, the key has the following properties: (i) start coordinate ("start"): 0.120, (ii) end coordinate ("end"): 0.121, (iii) CNDV: 1, and (iv) MNDV: 10. Further, the key has data "1119", which indicates grid bin's coordinates (e.g., start and end values of the coordinates) if a default bin size is used (and the data may change if the grid bin already existed and split).

Turning now to FIG. 3.2, in Step 3, a vector with an X-dimension value of −0.2054 is ingested (e.g., by the manager (e.g., 125, FIG. 1)). Because there is no key (in the B-Tree) that can hold the ingested vector, a newer key (i.e., a newer grid bin) needs to be inserted to the tree root node, as there is space in the node. As indicated by the tree root node of the B-Tree, the key has the following properties: (i) start coordinate ("start"): −0.206, (ii) end coordinate ("end"): −0.205, (iii) CNDV: 1, and (iv) MNDV: 10. Further, the key has data "794", which indicates grid bin's coordinates if a default bin size is used (and the data may change if the grid bin already existed and split).

Turning now to FIG. 3.3, FIG. 3.3 shows an example process to illustrate how to ingest vectors and perform a B-Tree node split in accordance with one or more embodiments disclosed herein. The example (or the example scenario), illustrated in FIG. 3.3 and described below, is explanatory purposes only and not intended to limit the scope disclosed herein.

Referring to FIG. 3.3, in Step 4, a vector with an X-dimension value of 0.4121 is ingested (e.g., by the manager (e.g., 125, FIG. 1)). Because there is no key (in the B-Tree) that can hold the ingested vector, a newer key (i.e., a newer grid bin) needs to be inserted to the tree root node, but the tree root node is already full. For this reason, the tree root node needs to be split so that newer nodes can be added to the B-Tree. As indicated, the vector with a smaller X-dimension value (e.g., −0.2054) is moved to a left leaf node of the B-Tree and the vector with a greater X-dimension value (e.g., 04121) is moved to a right leaf node of the B-Tree.

Further, as indicated by the right leaf node of the B-Tree, the key has the following properties: (i) start coordinate ("start"): 0.412, (ii) end coordinate ("end"): 0.413, (iii) CNDV: 1, and (iv) MNDV: 10. Further, the key has data "1411", which indicates grid bin's coordinates if a default bin size is used (and the data may change if the grid bin already existed and split).

Turning now to FIG. 3.4, FIG. 3.4 shows an example process to illustrate how to ingest vectors to existing B-Tree keys in accordance with one or more embodiments disclosed herein. The example (or the example scenario), illustrated in FIG. 3.4 and described below, is explanatory purposes only and not intended to limit the scope disclosed herein.

Referring to FIG. 3.4, in Step 5, a vector with an X-dimension value of 0.412205 is ingested (e.g., by the manager (e.g., 125, FIG. 1)). An existing key (of the B-Tree) can hold this value and no newer B-Tree key needs to be inserted. To this end, as indicated in the right leaf node of the B-Tree, the "CNDV" field of the key is updated as two after ingesting the vector with the X-dimension value of 0.412205.

Turning now to FIG. 3.5, FIG. 3.5 shows an example process to illustrate how to ingest vectors and split existing B-Tree keys in accordance with one or more embodiments disclosed herein. The example (or the example scenario), illustrated in FIG. 3.5 and described below, is explanatory purposes only and not intended to limit the scope disclosed herein.

Referring to Step 6 (illustrated in FIG. 3.5), assume here that there are already vectors with ten distinguishable values in the B-Tree key [0.412, 0.413], and a vector with an X-dimension value of 0.412764 is ingested (e.g., by the manager (e.g., 125, FIG. 1)). The key of the right leaf node of the B-Tree has already reached the MNDV limit and needs to be split to satisfy the MNDV limit requirement. In order to split, the value of each vector may be considered so that each newer grid bin has almost the same number of vectors. Thereafter, the B-Tree may handle newer keys using an existing balancing mechanism.

As indicated, splitting in the middle with a grid bin size of 0.0005 results in two keys: (i) key 1: [0.4120, 04124], key 1 would have newer data "1411_0", in which "1411" was the data of the old key and (ii) key 2: [0.4125, 04130], key 2 would have newer data "1411_1", in which "1411" was the data of the old key.

Turning now to FIG. 3.6, FIG. 3.6 shows an example process to illustrate how to delete a vector and perform a delayed B-Tree key deletion in accordance with one or more embodiments disclosed herein. The example (or the example scenario), illustrated in FIG. 3.6 and described below, is explanatory purposes only and not intended to limit the scope disclosed herein.

Referring to FIG. 3.6, in Step 7, in order to delete a vector, the manager (e.g., 125, FIG. 1) may need to locate the key of the B-Tree that holds the value of the vector by traversing the B-Tree. To this end, (i) if the vector is not the last one in the grid bin/container, the manager may reduce the related "CNDV" (see "6→5" in the right leaf node), (ii) if the vector is the last one in the grid bin, the manager may reduce the related "CNDV" to 0, but may keep the key for a predetermined period of time so that in the future (if there are newer vectors added to the key, there is no need to insert a newer key to the B-Tree), and (iii) after the predetermined period of time elapses, the manager may delete the key from the B-Tree following a typical B-Tree delete process.

FIGS. 4.1-4.4 show a method for performing VSS in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 4.1, the method shown in FIG. 4.1 may be executed by, for example, the above-discussed manager (e.g., 125, FIG. 1). Other components of the system (100) illustrated in FIG. 1 may also execute all or part of the method shown in FIG. 4.1 without departing from the scope of the embodiments disclosed herein.

In Step 400, based on a set of predetermined thresholds, the manager performs a sparse partitioning of n-dimensional hyperspace into one or more grid bins to generate a hyperspace partition map, in which (i) only grid bins to which vectors mapped to are managed by the hyperspace partition map and (ii) each grid bin of the grid bins points to a unique storage location in the storage (e.g., 135, FIG. 1). In one or more embodiments, a threshold of the set of predetermined thresholds may specify, for example, that more than ten vectors should not be mapped to a grid bin. Further, for not suffering from the "curse of dimensionality" problem (which may occur when the hyperspace partition map keeps track of every grid bin), the hyperspace partition map may manage only grid bins with vectors mapped to them. Referring to FIG. 2.5, that is why B-Trees are used to track only these grid bins.

In Step 402, the manager ingests a vector (e.g., $V_a$ ($x_a$, $y_a$, $z_a$)). In Step 404, by employing a set of linear, non-linear, and/or ML models, the manager analyzes the "ingested" vector to infer its components. In Step 406, the manager uses the hyperspace partition map (generated in Step 400) to identify/locate (i) a grid bin (with a suitable range) of the grid bins for the vector and (ii) coordinates of the grid bin (e.g., (b1, b2, b3)). In Step 408, the manager maps the vector to the identified grid bin.

In Step 410, by employing a hash function (e.g., SHA-1 model), the manager hashes the coordinates of the grid bin to generate/update a storage location key that is associated with a second storage location (in the storage). In Step 412, the manager stores the vector (as the storage location key's value) to the second storage location (pointed by the grid bin) using the storage location key.

Turning now to FIG. 4.2, the method shown in FIG. 4.2 may be executed by, for example, the above-discussed manager. Other components of the system (100) illustrated in FIG. 1 may also execute all or part of the method shown in FIG. 4.2 without departing from the scope of the embodiments disclosed herein.

In Step 414, the manager makes a first determination (in real-time or near real-time) as to whether the vector is no longer in use and/or related to (or reflect) incorrect information. Accordingly, in one or more embodiments, if the result of the first determination is NO, the method ends. If the result of the first determination is YES (which indicates that there is no need to assign storage space (in the storage) for the vector), the method proceeds to Step 416.

In Step 416, as a result of the first determination in Step 414 being YES, the manager uses the hyperspace partition map (generated in Step 400 of FIG. 4.1) (i) to look up (or query) a grid bin that the vector should be mapped to and (ii) to identify coordinates of the grid bin. In Step 418, via a corresponding storage location key, the manager finds/identifies the vector that is stored in a storage location (e.g., the second storage location) (in the storage) pointed by the grid bin. Said another way, the manager obtains storage location information of the vector (from the storage) using the corresponding storage location key.

In Step 420, based on the corresponding storage location, the manager deletes the vector (e.g., vector representation of related information) from the storage by updating/deleting the corresponding storage location key's value (which is indeed the vector itself). In this manner, when a user queries the vector (that is no longer in use and/or related to incorrect information), the user will not be provided with, for example, incorrect information (in response to the query).

In Step 422, the manager updates the hyperspace partition map to obtain an updated hyperspace partition map so that the updated map may be used while performing VSS, for example, at a later point-in-time. In one or more embodiments, the method may end following Step 422.

Turning now to FIG. 4.3, the method shown in FIG. 4.3 may be executed by, for example, the above-discussed manager after the vector is stored to the second storage location. Other components of the system (100) illustrated in FIG. 1 may also execute all or part of the method shown in FIG. 4.3 without departing from the scope of the embodiments disclosed herein.

In Step 430, the manager receives a request (e.g., a data search request) from a requesting entity (e.g., a user of a client (e.g., 110A, FIG. 1), an administrator terminal, an application, etc.) that wants to retrieve specific data (e.g., images that include "XYZ-234") from the storage.

In Step 432, upon receiving the request, the manager initiates performing VSS to query a vector (in the storage) related to the request (or query a vector representation of the query). In Step 434, the manager uses the hyperspace partition map to: (i) look up (or query) a grid bin to which the vector should be mapped (e.g., a main candidate grin bin to which the vector should fall into), (ii) identify coordinates of a corresponding grid bin (e.g., the main candidate grid bin), (iii) identify one or more neighboring grid bins of the corresponding grid bin, and (iv) identify coordinates of each of the neighboring grid bins.

Thereafter, the manager may hash the coordinates of the corresponding grid bin to obtain/generate a second storage location key and may hash, for example, coordinates of a neighboring grid bin of the neighboring grid bins to obtain/generate a third storage location key. Additional details of Step 434 are described below in reference to FIG. 4.4.

In Step 436, the manager finds/retrieves, via corresponding keys (e.g., the second storage location key, the third storage location key, etc.), a set of vectors stored in storage locations (in the storage) pointed by the corresponding grid bin and the neighboring grid bins. In Step 438, the manager computes a distance between the vector (related to the request received in Step 430) and each of the set of vectors. In Step 440, based on each computed distance, the manager identifies one or more vectors that are closer to the vector (related to the request received in Step 430). After identifying the "closer" vectors, the manager may rank them based on their computed distance. For example, as a result of ranking, a third vector (of the "closer" vectors) may be ranked at the top of the list and identified as the closest vector to the vector (related to the request received in Step 430).

In Step 442, based on Step 440, the manager initiates (via a GUI of the client) displaying of data associated with the identified vectors (e.g., the third vector) as a response to the request received in Step 430. In one or more embodiments, the method may end following Step 442.

Turning now to FIG. 4.4, the method shown in FIG. 4.4 may be executed by, for example, the above-discussed manager while using the hyperspace partition map to look up for a related grid bin. Other components of the system (100) illustrated in FIG. 1 may also execute all or part of the method shown in FIG. 4.4 without departing from the scope of the embodiments disclosed herein.

In Step 450, the manager makes a second determination (in real-time or near real-time) as to whether latency of a user query (e.g., amount of time required to search for a vector related to the user query) is greater than a user-defined query latency related SLA. Accordingly, in one or more embodiments, if the result of the second determination is NO, the method ends. If the result of the second determination is YES (which indicates that a corresponding grid bin where VSS is being performed is overpopulated and/or a query threshold is exceeded), the method proceeds to Step 452.

In Step 452, as a result of the second determination in Step 450 being YES, the manager splits the overpopulated grid bin (along a related dimension/axis of the hyperspace) in order to (i) simplify the VSS (so that the vector search time will become manageable) and (ii) maintain a maximum number of vectors pointed in the grid bin (or comply with the query latency related SLA).

In Step 454, based on Step 452, the manager updates the hyperspace partition map to obtain an updated hyperspace partition map so that the updated map may be used while performing the VSS. In Step 456, based on the updated hyperspace partition map, the manager updates related storage location (in the storage) to reflect the updated hyperspace partition map. In one or more embodiments, the method may end following Step 456.

Turning now to FIG. 5, FIG. 5 shows a diagram of a computing device in accordance with one or more embodiments disclosed herein.

In one or more embodiments disclosed herein, the computing device (500) may include one or more computer processors (502), non-persistent storage (504) (e.g., volatile memory, such as RAM, cache memory), persistent storage (506) (e.g., a non-transitory computer readable medium, a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing vector similarity search (VSS), the method comprising:
   performing, by a computing device based on a set of predetermined thresholds, a sparse partitioning of n-dimensional hyperspace into a plurality of grid bins to generate a hyperspace partition map, wherein n is a number, wherein only grid bins of the plurality of grid bins to which vectors mapped to are managed by the hyperspace partition map, wherein each grid bin of the plurality of grid bins points to a unique storage location in a storage device;
   ingesting, by the computing device, a vector of the vectors;
   using, by the computing device based on a result of a determination made in real-time as to whether the vector is related to incorrect information, the hyperspace partition map to identify a grid bin of the plurality of grid bins for the ingested vector and to identify coordinates of the grid bin;
   mapping, by the computing device, the ingested vector to the grid bin;
   hashing, by the computing device, the coordinates to generate a storage location key associated with a second storage location, wherein the ingested vector is stored to the second storage location using the storage location key;
   after the ingested vector is stored to the second storage location:
   receiving a request from a user via a device;
   upon the receiving the request, performing the VSS to query a second vector related to the request;
   using the hyperspace partition map to:
      look up a second grid bin to which the second vector should be mapped, wherein the looking up includes making a determination that vector query latency is greater than a user-defined service level agreement;
      identify second coordinates of the second grid bin,
      identify a neighboring grid bin of the second grid bin, and
      identify third coordinates of the neighboring grid bin;
   hashing, by the computing device, the second coordinates of the second grid bin to generate a second storage location key that is different from the storage location key;
   hashing, by the computing device, the third coordinates of the neighboring grid bin to generate a third storage location key that is different from the storage location key and the second storage location key;
   while performing the VSS, finding, by the computing device via the second storage location key and the third storage location key, a set of vectors stored in storage locations pointed by the second grid bin and the neighboring grid bin;
   computing, by the computing device, a distance between the second vector and each vector of the set of vectors;
   identifying, by the computing device based on the computing the distance, a third vector that is closer to the second vector; and
   initiating, via a graphical user interface of the computing device, displaying of data associated with the third vector in as a response to the request; and
   prior to the receiving the request from the user via the device: updating, after deleting the vector from the storage device, the hyperspace partition map stored in the storage device while performing a second VSS on a computing device, the second VSS is different from the VSS.

2. The method of claim 1, wherein the hyperspace partition map specifies a plurality of B-trees.

3. The method of claim 1, wherein each dimension of the n-dimensional hyperspace has a separate B-tree.

4. The method of claim 1, further comprising:
   prior to receiving the request from the user: making a determination that the vector is related to incorrect information;
   using, based on the determination, the hyperspace partition map to look up a third grid bin that the vector should be mapped to and to identify the third coordinates of the third grid bin;
   finding, via the storage location key, the vector that is stored in the second storage location.

5. The method of claim 1, wherein the storage device is a key-value store.

6. The method of claim 1, wherein the n-dimensional hyperspace comprises a first dimension, a second dimension, and a third dimension, wherein the first dimension comprises a first grid bin, wherein the first dimension comprises a second grid bin, and wherein the first dimension comprises a third grid bin.

7. The method of claim 1, further comprising:
   while using the map to look up the second grid bin:
   splitting, based on the determination, the second grid bin along a corresponding dimension in the n-dimensional hyperspace;
   updating, based on the splitting, the hyperspace partition map to obtain an updated hyperspace partition map to be used while performing the VSS; and
   updating the storage device to reflect the updated hyperspace partition map.

8. The method of claim 1, wherein a threshold of the thresholds specifies that more than ten vectors should not be mapped to the grid bin, the method further comprising:
   initiating a split of the grid bin when the threshold is exceeded.

9. A non-transitory computer-readable medium comprising computer-readable program code, which when executed by a computer processor enables the computer processor to perform vector similarity search (VSS), the method comprising:
   performing, based on a set of predetermined thresholds, a sparse partitioning of n-dimensional hyperspace into a plurality of grid bins to generate a hyperspace partition map, wherein n is a number, wherein only grid bins of the plurality of grid bins to which vectors mapped to are managed by the hyperspace partition map, wherein each grid bin of the plurality of grid bins points to a unique storage location in a storage device;

ingesting a vector of the vectors;

using, based on a result of determination made in real-time as to whether the vector is related to incorrect information, the hyperspace partition map to identify a grid bin of the plurality of grid bins for the ingested vector and to identify coordinates of the grid bin;

mapping the ingested vector to the grid bin;

hashing the coordinates to generate a storage location key associated with a second storage location, wherein the ingested vector is stored to the second storage location using the storage location key;

after the ingested vector is stored to the second storage location:

receiving a request from a user via a device;

upon the receiving the request, performing the VSS to query a second vector related to the request;

using the hyperspace partition map to:
look up a second grid bin to which the second vector should be mapped, wherein the looking up includes making a determination that vector query latency is greater than a user-defined service level agreement;
identify second coordinates of the second grid bin, identify a neighboring grid bin of the second grid bin, and
identify third coordinates of the neighboring grid bin;

hashing the second coordinates of the second grid bin to generate a second storage location key that is different from the storage location key;

hashing the third coordinates of the neighboring grid bin to generate a third storage location key that is different from the storage location key and the second storage location key;

while performing the VSS, finding, via the second storage location key and the third storage location key, a set of vectors stored in storage locations pointed by the second grid bin and the neighboring grid bin;

computing a distance between the second vector and each vector of the set of vectors;

identifying based on the computing the distance, a third vector that is closer to the second vector; and initiating, via a graphical user interface of a computing device, displaying of data associated with the third vector as a response to the request; and prior to the receiving the request from the user via the device: updating, after deleting the vector from the storage device, the hyperspace partition map stored in the storage device while performing a second VSS on a computing device, the second VSS is different from the VSS.

10. The non-transitory computer-readable medium of claim 9, wherein the hyperspace partition map specifies a plurality of B-trees.

11. The non-transitory computer-readable medium of claim 9, wherein each dimension of the n-dimensional hyperspace has a separate B-tree.

12. The non-transitory computer-readable medium of claim 9, further comprising:
prior to receiving the request from the user:
making a determination that the vector is related to incorrect information;
using, based on the determination, the hyperspace partition map to look up a third grid bin that the vector should be mapped to and to identify the third coordinates of the third grid bin; and
finding, via the storage location key, the vector that is stored in the second storage location.

13. The non-transitory computer-readable medium of claim 9, wherein the storage device is a key-value store.

14. The non-transitory computer-readable medium of claim 9, wherein the n-dimensional hyperspace comprises a first dimension, a second dimension, and a third dimension, wherein the first dimension comprises a first grid bin, wherein the first dimension comprises a second grid bin, and wherein the first dimension comprises a third grid bin.

15. The non-transitory computer-readable medium of claim 9, further comprising:
while using the map to look up the second grid bin;
splitting, based on the determination, the second grid bin along a corresponding dimension in the hyperspace;
updating, based on the splitting, the hyperspace partition map to obtain an updated hyperspace partition map to be used while performing the VSS; and
updating the storage device to reflect the updated hyperspace partition map.

16. The non-transitory computer-readable medium of claim 9, wherein a threshold of the thresholds specifies that more than ten vectors should not be mapped to the grid bin, the method further comprising: initiating a split of the grid bin when the threshold is exceeded.

17. A system comprising:
a manager comprising a memory and a processor coupled to the memory, wherein the processor is configured to execute a method for performing vector similarity search (VSS), the method comprising:
performing, based on a set of predetermined thresholds, a sparse partitioning of n-dimensional hyperspace into a plurality of grid bins to generate a hyperspace partition map, wherein n is a number, wherein only grid bins of the plurality of grid bins to which vectors mapped to are managed by the hyperspace partition map, wherein each grid bin of the plurality of grid bins points to a unique storage location in a storage device;

ingesting a vector of the vectors;

using, based on a result of determination that is made in real-time as to whether the vector is related to incorrect information, the hyperspace partition map to identify a grid bin of the plurality of grid bins for the ingested vector and to identify coordinates of the grid bin;

mapping the ingested vector to the grid bin;

hashing the coordinates to generate a storage location key associated with a second storage location, wherein the ingested vector is stored to the second storage location using the storage location key;

after the ingested vector is stored to the second storage location:

receiving a request from a user via a device;

upon the receiving the request, performing the VSS to query a second vector related to the request;

using the hyperspace partition map to:
look up a second grid bin to which the second vector should be mapped, wherein the looking up includes making a determination that vector query latency is greater than a user-defined service level agreement;
identify second coordinates of the second grid bin, identify a neighboring grid bin of the second grid bin, and
identify third coordinates of the neighboring grid bin;

hashing the second coordinates of the second grid bin to generate a second storage location key that is different from the storage location key;

hashing the third coordinates of the neighboring grid bin to generate a third storage location key that is different from the storage location key and the second storage location key;

while performing the VSS, finding, via the second storage location key and the third storage location key, a set of vectors stored in storage locations pointed by the second grid bin and the neighboring grid bin;

computing a distance between the second vector and each vector of the set of vectors;

identifying based on the computing the distance, a third vector that is closer to the second vector; and initiating, via a graphical user interface of a computing device, displaying of data associated with the third vector as a response to the request; and prior to the receiving the request from the user via the device: updating, after deleting the vector from the storage device, the hyperspace partition map stored in the storage device while performing a second VSS on a computing device, the second VSS is different from the VSS.

18. The system of claim 17, wherein the hyperspace partition map specifies a plurality of B-trees.

19. The system of claim 17, wherein each dimension of the n-dimensional hyperspace has a separate B-tree.

20. The system of claim 17, further comprising:
prior to receiving the request from the user:
making a determination that the vector is related to incorrect information;
using, based on the determination, the hyperspace partition map to look up a third grid bin that the vector should be mapped to and to identify the third coordinates of the third grid bin; and
finding, via the storage location key, the vector that is stored in the second storage location.

\* \* \* \* \*